US010196883B2

(12) United States Patent
Robison et al.

(10) Patent No.: US 10,196,883 B2
(45) Date of Patent: *Feb. 5, 2019

(54) LONG-STROKE PUMPING UNIT

(71) Applicant: Weatherford Technology Holdings, LLC, Houston, TX (US)

(72) Inventors: Clark E. Robison, Tomball, TX (US); Benson Thomas, Pearland, TX (US); William C. Lane, The Woodlands, TX (US); Darius John Yakimchuk, St. Albert (CA); Jeffrey John Lembcke, Cypress, TX (US); Bryan A. Paulet, Spring, TX (US); Brandon M. Cain, Houston, TX (US); Sean M. Christian, Sparrows Point, MD (US); Paul L. Smith, Katy, TX (US)

(73) Assignee: WEATHERFORD TECHNOLOGY HOLDINGS, LLC, Houstone, TX (US)

( * ) Notice: Subject to any disclaimer, the term of this patent is extended or adjusted under 35 U.S.C. 154(b) by 142 days.

This patent is subject to a terminal disclaimer.

(21) Appl. No.: 14/992,799

(22) Filed: Jan. 11, 2016

(65) Prior Publication Data

US 2016/0201664 A1 Jul. 14, 2016

Related U.S. Application Data

(60) Provisional application No. 62/101,405, filed on Jan. 9, 2015.

(51) Int. Cl.
*F04B 47/14* (2006.01)
*E21B 43/12* (2006.01)
(Continued)

(52) U.S. Cl.
CPC ............ *E21B 43/126* (2013.01); *F04B 17/03* (2013.01); *F04B 17/05* (2013.01); *F04B 47/02* (2013.01);
(Continued)

(58) Field of Classification Search
CPC ..................................................... E21B 43/126
(Continued)

(56) References Cited

U.S. PATENT DOCUMENTS 2,351,183 A 6/1944 Blackburn
2,683,379 A 7/1954 Strandgren
(Continued)

FOREIGN PATENT DOCUMENTS

WO 2014/182272 A1 11/2014

OTHER PUBLICATIONS

Weatherford; Rotaflex Long-Stroke Pumping Units; Artificial Lift Systems; date unknown; 17 total pages.
(Continued)

*Primary Examiner* — Taras P Bemko
(74) *Attorney, Agent, or Firm* — Patterson + Sheridan, LLP

(57) ABSTRACT

A long-stroke pumping unit includes a tower; a counterweight assembly movable along the tower; a drum connected to an upper end of the tower and rotatable relative thereto. The unit also includes a belt having a first end connected to the counterweight assembly, extending over the drum, and having a second end connectable to a rod string. The unit further includes a prime mover for reciprocating the counterweight assembly along the tower; a sensor for detecting sudden acceleration of the counterweight assembly due to failure of the rod string; and a controller in communication with the sensor and operable to activate the braking or arrestor system in response to detection of the sudden acceleration. The unit further includes at least one of a braking system for halting free-fall of the counterweight assembly; and an arrestor system for absorbing kinetic energy of the falling counterweight assembly.

24 Claims, 12 Drawing Sheets

(51) Int. Cl.
*F04B 17/03* (2006.01)
*F04B 17/05* (2006.01)
*F16F 15/023* (2006.01)
*F16F 15/027* (2006.01)
*F16F 15/03* (2006.01)
*F04B 47/02* (2006.01)

(52) U.S. Cl.
CPC ............ *F04B 47/14* (2013.01); *F16F 15/023* (2013.01); *F16F 15/027* (2013.01); *F16F 15/03* (2013.01)

(58) Field of Classification Search
USPC .......................................................... 166/75.1
See application file for complete search history.

(56) References Cited

U.S. PATENT DOCUMENTS

| | | | |
|---|---|---|---|
| 2,694,933 A | 11/1954 | Blackburn | |
| 3,153,387 A | 10/1964 | Sadouet | |
| 3,917,092 A | 11/1975 | McGinnis | |
| 4,388,837 A | 6/1983 | Bender | |
| 4,391,155 A | 7/1983 | Bender | |
| 4,519,262 A | 5/1985 | Le et al. | |
| 4,647,050 A | 3/1987 | Johnson | |
| 4,916,959 A | 4/1990 | Lively | |
| 4,932,253 A | 6/1990 | McCoy | |
| 5,020,640 A | 6/1991 | Nederbragt | |
| 5,196,770 A | 3/1993 | Champs et al. | |
| 5,385,514 A | 1/1995 | Dawe | |
| 5,404,767 A | 4/1995 | Sutherland | |
| 5,440,183 A | 8/1995 | Denne | |
| 5,540,095 A | 7/1996 | Sherman et al. | |
| 6,011,508 A | 1/2000 | Perreault et al. | |
| 6,101,952 A | 8/2000 | Thornton et al. | |
| 6,499,701 B1 | 12/2002 | Thornton et al. | |
| 6,508,132 B1 | 1/2003 | Lohr et al. | |
| 6,578,495 B1 | 6/2003 | Yitts et al. | |
| 6,606,569 B1 | 8/2003 | Potts | |
| 6,770,004 B1 | 8/2004 | Lofgren et al. | |
| 6,851,476 B2 | 2/2005 | Gray et al. | |
| 6,983,701 B2 | 1/2006 | Thornton et al. | |
| 7,178,600 B2 | 2/2007 | Luke et al. | |
| 7,290,476 B1 | 11/2007 | Glasson | |
| 7,373,971 B2 | 5/2008 | Montgomery | |
| 7,530,799 B2 | 5/2009 | Smith | |
| 7,579,941 B2 | 8/2009 | Cleveland et al. | |
| 7,857,043 B2 | 12/2010 | Ali-zada | |
| 8,036,829 B2 | 10/2011 | Gibbs et al. | |
| 8,256,579 B2 | 9/2012 | Jia | |
| 8,328,527 B2 | 12/2012 | Ehimeakhe | |
| 8,616,134 B2 | 12/2013 | King et al. | |
| 8,624,699 B2 | 1/2014 | Hunter et al. | |
| 8,849,954 B2 | 9/2014 | Kim | |
| 8,851,860 B1 | 10/2014 | Mail | |
| 8,858,187 B2 | 10/2014 | Lane | |
| 2008/0018603 A1 | 1/2008 | Baraz et al. | |
| 2012/0000731 A1 | 1/2012 | Schienda et al. | |
| 2012/0020808 A1 | 1/2012 | Lawson et al. | |
| 2012/0230841 A1* | 9/2012 | Gregory | F04B 47/02 417/44.1 |
| 2013/0186638 A1 | 7/2013 | Filippov et al. | |
| 2014/0069720 A1 | 3/2014 | Gray | |
| 2014/0312716 A1 | 10/2014 | Hunter et al. | |

OTHER PUBLICATIONS

Analog Devices; Data Sheet; Precision ±1.7 g, ±5 g, ±18 g Single-/Dual-Axis iMEMS Accelerometer; 2004-2014; 16 total pages.
Dr. Richard Thornton; Elevator World; Linear Synchronous Motors for Elevators dated Sep. 2006; 2 total pages.
Weatherford; Production Optimization; Stainless Steel Polished-Rod Load Cell dated 2008; 2 total pages.
Wieler, et al.; Elevator World; Linear Synchronous Motor Elevators Become a Reality; dated May 2012; 4 total pages.
MagneMotion; LSM Elevators; White Paper dated 2013; 2 total pages.
Weatherford; Rotaflex Long-Stroke Pumping Units; Proven Technology for Deep, Challenging, and High-Volume Wells; dated 2014; 24 total pages.
U.S. Appl. No. 14/717,441 entitled Dart Detector for Wellbore Tubular Cementation in the name of Zippel, et al; 35 total pages; filed May 20, 2015.
PCT International Search Report and Written Opinion dated Apr. 8, 2016, for International Patent Application No. PCT/US2016/012866.

\* cited by examiner

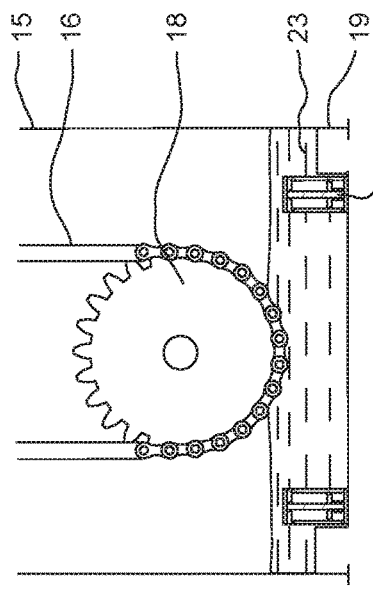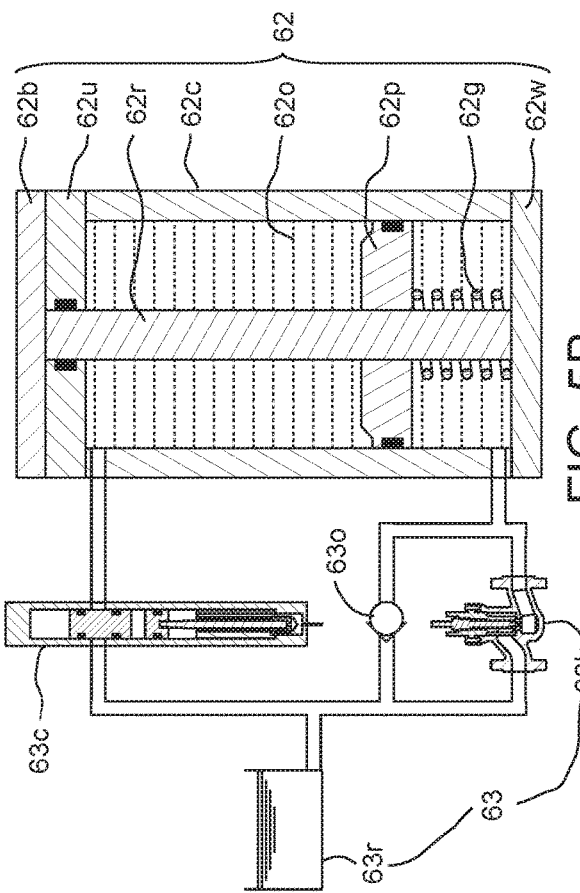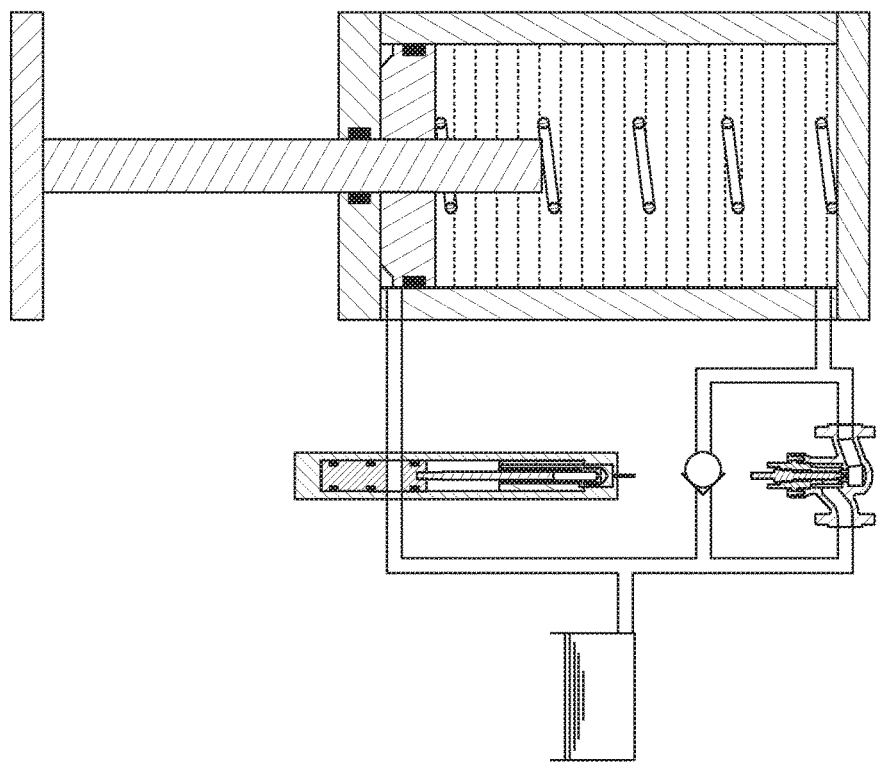

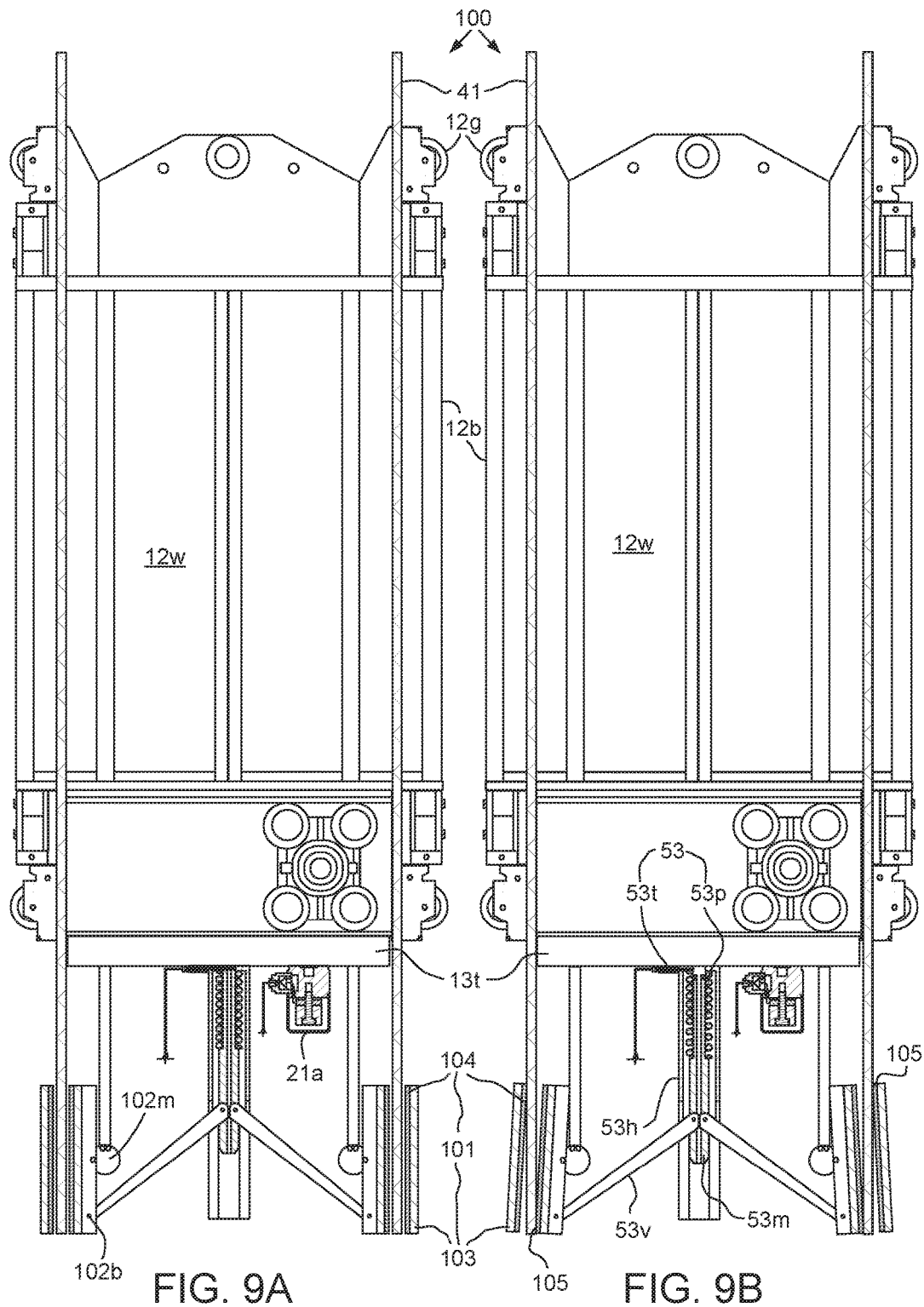

LONG-STROKE PUMPING UNIT

BACKGROUND OF THE DISCLOSURE

Field of the Disclosure

The present disclosure generally relates to a braking system or an arrestor system for a long-stroke pumping unit.

Description of the Related Art

To obtain hydrocarbon fluids, a wellbore is drilled into the earth to intersect a productive formation. Upon reaching the productive formation, an artificial lift system is often necessary to carry production fluid (e.g., hydrocarbon fluid) from the productive formation to a wellhead located at a surface of the earth. A sucker rod lifting system is a common type of artificial lift system.

The sucker rod lifting system generally includes a surface drive mechanism, a sucker rod string, and a downhole pump. Fluid is brought to the surface of the wellbore by reciprocating pumping action of the drive mechanism attached to the rod string. Reciprocating pumping action moves a traveling valve on the pump, loading it on the down-stroke of the rod string and lifting fluid to the surface on the up-stroke of the rod string. A standing valve is typically located at the bottom of a barrel of the pump which prevents fluid from flowing back into the well formation after the pump barrel is filled and during the down-stroke of the rod string. The rod string provides the mechanical link of the drive mechanism at the surface to the pump downhole.

One such surface drive mechanism is known as a long-stroke pumping unit. The long-stroke pumping unit includes a counterweight which travels along a tower during operation thereof. Should the sucker rod string fail, there is a potential that the counterweight assembly will free fall and damage various parts of the pumping unit as it crashes under the force of gravity. The sudden acceleration of the counterweight assembly may not be controllable using the existing long-stroke pumping unit.

SUMMARY OF THE DISCLOSURE

The present disclosure generally relates to a braking system for a long-stroke pumping unit. In one embodiment, a long-stroke pumping unit includes: a tower; a counterweight assembly movable along the tower; a drum connected to an upper end of the tower and rotatable relative thereto; a belt having a first end connected to the counterweight assembly, extending over the drum, and having a second end connectable to a rod string; a prime mover for reciprocating the counterweight assembly along the tower; a sensor for detecting sudden acceleration of the counterweight assembly due to failure of the rod string; at least one of: a braking system for halting free-fall of the counterweight assembly; and an arrestor system for absorbing kinetic energy of the falling counterweight assembly; and a controller in communication with the sensor and operable to activate the braking system or the arrestor system in response to detection of the sudden acceleration.

In another embodiment, a long-stroke pumping unit includes a tower; a counterweight assembly movable along the tower; a drum connected to an upper end of the tower and rotatable relative thereto; a belt having a first end connected to the counterweight assembly, extending over the drum, and having a second end connectable to a rod string; a prime mover for reciprocating the counterweight assembly along the tower; and a braking system for halting movement of the counterweight assembly due to failure of the rod string.

In another embodiment, a long-stroke pumping unit includes a tower; a counterweight assembly movable along the tower; a drum connected to an upper end of the tower and rotatable relative thereto; a belt having a first end connected to the counterweight assembly, extending over the drum, and having a second end connectable to a rod string; a prime mover for reciprocating the counterweight assembly along the tower; and an arrestor system for absorbing kinetic energy of the counterweight assembly falling due to failure of the rod string.

In another embodiment, a long-stroke pumping unit includes a tower; a counterweight assembly movable along the tower; a drum connected to an upper end of the tower and rotatable relative thereto; a belt having a first end connected to the counterweight assembly, extending over the drum, and having a second end connectable to a rod string; a prime mover for reciprocating the counterweight assembly along the tower; and a sensor for detecting acceleration of the counterweight assembly due to failure of the rod string. In yet another embodiment, the unit further includes a controller in communication with the sensor and operable to activate a braking system or an arrestor system in response to detection of the acceleration.

In another embodiment, a method of pumping hydrocarbon using a long-stroke pumping unit includes operating the long-stroke pumping unit, the long-stroke pumping unit having a tower; a counterweight assembly movable along the tower; a drum connected to an upper end of the tower and rotatable relative thereto; a belt having a first end connected to the counterweight assembly, extending over the drum, and having a second end connectable to a rod string; and a prime mover for reciprocating the counterweight assembly along the tower. The method includes detecting acceleration of the counterweight assembly due to failure of the rod string; activating at least one of a braking system for halting movement of the counterweight assembly; and an arrestor system for absorbing kinetic energy of the moving counterweight assembly, in response to detection of the acceleration.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 5A illustrates an arrestor system for use with the long-stroke pumping unit in an idle position, according to another embodiment of the present disclosure. FIG. 5B illustrates an arrestor of the arrestor system in the idle position. FIG. 5C illustrates the arrestor in a ready position.

FIG. 9A illustrates a fourth alternative braking system for use with the long-stroke pumping unit in a disengaged position, according to another embodiment of the present disclosure. FIG. 9B illustrates the fourth alternative braking system in an engaged position.

DETAILED DESCRIPTION

Figure 1A:
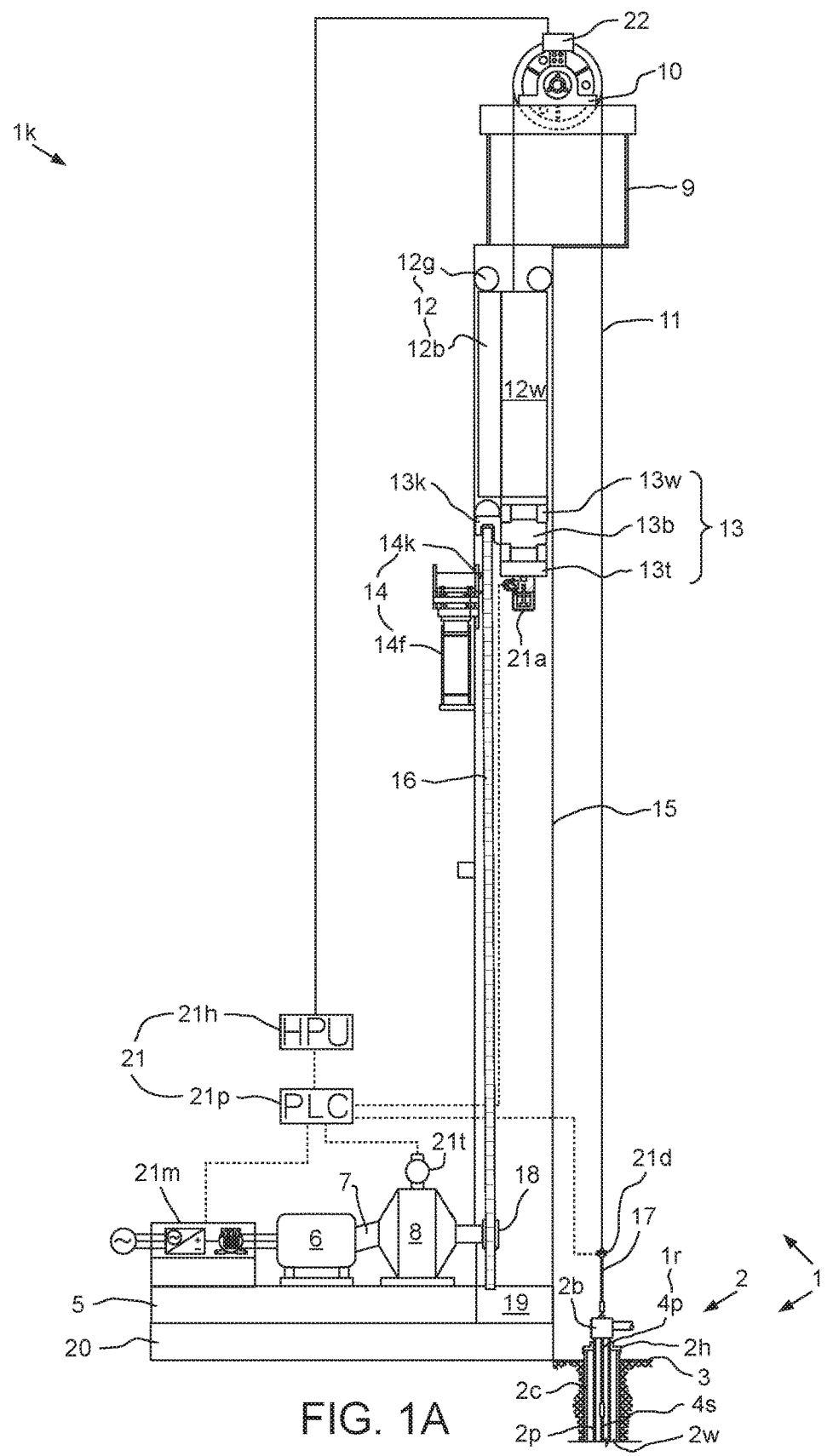
FIGS. 1A and 1B illustrate a long-stroke pumping unit, according to one embodiment of the present disclosure.
Figures 1B, 1C, 1D:
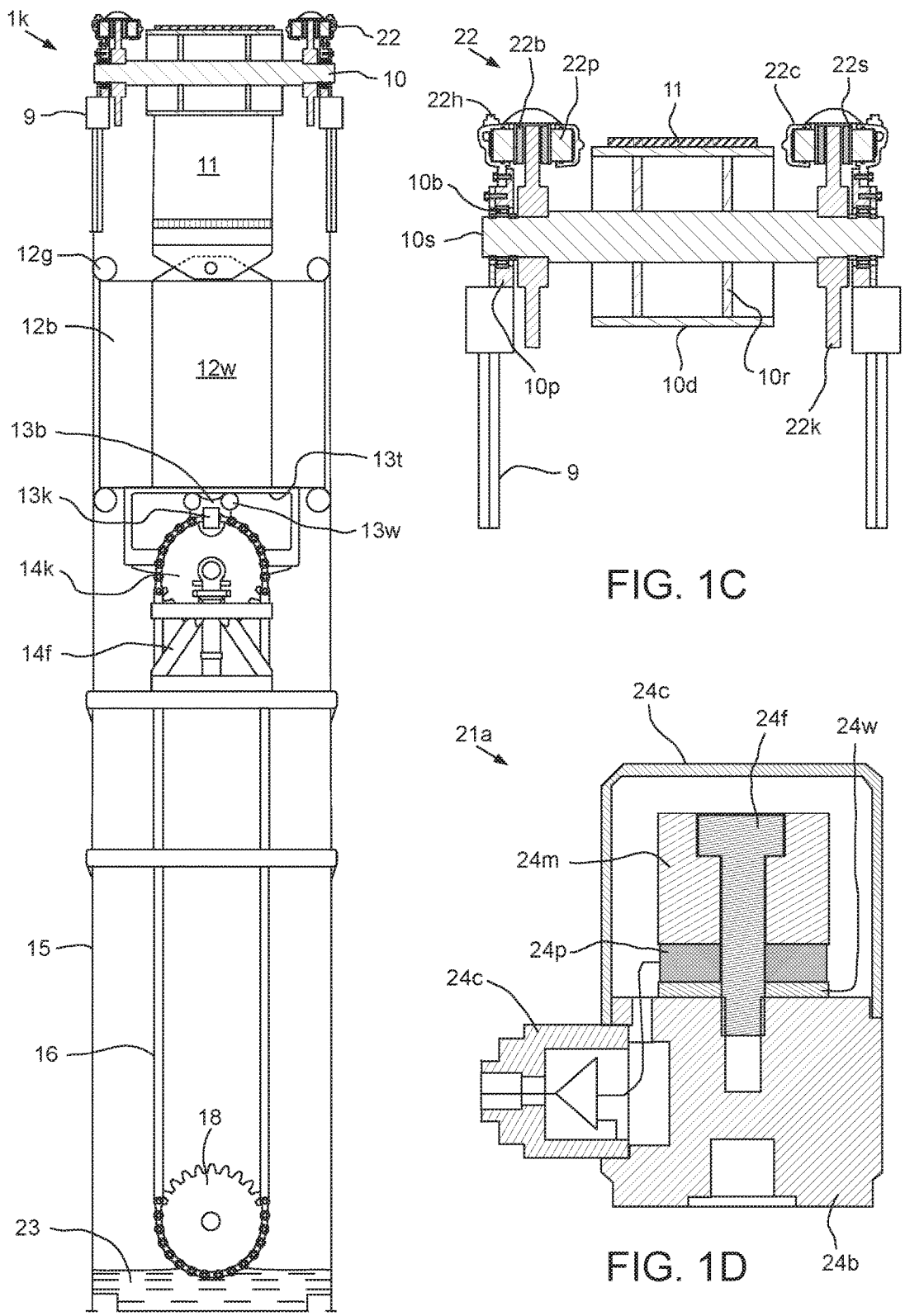
FIG. 1C illustrates a braking system of the long-stroke pumping unit.
FIG. 1D illustrates an accelerometer of the long-stroke pumping unit.

FIGS. 1A and 1B illustrate a long-stroke pumping unit 1$k$, according to one embodiment of the present disclosure. The long-stroke pumping unit 1$k$ may be part of an artificial lift system 1 further including a rod string 1$r$ and a downhole pump (not shown). The artificial lift system 1 may be operable to pump production fluid (not shown) from a hydrocarbon bearing formation (not shown) intersected by a well 2. The well 2 may include a wellhead 2$h$ located adjacent to a surface 3 of the earth and a wellbore 2$w$ extending from the wellhead. The wellbore 2$w$ may extend from the surface 3 through a non-productive formation and through the hydrocarbon-bearing formation (aka reservoir).

A casing string 2$c$ may extend from the wellhead 2$h$ into the wellbore 2$w$ and be sealed therein with cement (not shown). A production string 2$p$ may extend from the wellhead 2$h$ and into the wellbore 2$w$. The production string 2$p$ may include a string of production tubing and the downhole pump connected to a bottom of the production tubing. The production tubing may be hung from the wellhead 2$h$.

The downhole pump may include a tubular barrel with a standing valve located at the bottom that allows production fluid to enter from the wellbore 2$w$, but does not allow the fluid to leave. Inside the pump barrel may be a close-fitting hollow plunger with a traveling valve located at the top. The traveling valve may allow fluid to move from below the plunger to the production tubing above and may not allow fluid to return from the tubing to the pump barrel below the plunger. The plunger may be connected to a bottom of the rod string 1$r$ for reciprocation thereby. During the upstroke of the plunger, the traveling valve may be closed and any fluid above the plunger in the production tubing may be lifted towards the surface 3. Meanwhile, the standing valve may open and allow fluid to enter the pump barrel from the wellbore 2$w$. During the downstroke of the plunger, the traveling valve may be open and the standing valve may be closed to transfer the fluid from the pump barrel to the plunger.

The rod string 1$r$ may extend from the long-stroke pumping unit 1$k$, through the wellhead 2$h$, and into the wellbore 2$w$. The rod string 1$r$ may include a jointed or continuous sucker rod string 4$s$ and a polished rod 4$p$. The polished rod 4$p$ may be connected to an upper end of the sucker rod string 4$s$ and the pump plunger may be connected to a lower end of the sucker rod string, such as by threaded couplings.

A production tree (not shown) may be connected to an upper end of the wellhead 2$h$ and a stuffing box 2$b$ may be connected to an upper end of the production tree, such as by flanged connections. The polished rod 4$p$ may extend through the stuffing box 2$b$. The stuffing box 2$b$ may have a seal assembly (not shown) for sealing against an outer surface of the polished rod 4$p$ while accommodating reciprocation of the rod string 1$r$ relative to the stuffing box.

The long-stroke pumping unit 1$k$ may include a skid 5, a prime mover, such as an electric motor 6, a rotary linkage 7, a reducer 8, one or more ladders and platforms (not shown), a standing strut (not shown), a crown 9, a drum assembly 10, a load belt 11, one or more wind guards (not shown), a counterweight assembly 12, a carriage 13, a chain idler 14, a tower 15, a chain 16, a hanger bar 17, a drive sprocket 18, a tower base 19, a foundation 20, a control system 21, and a braking system 22. The control system 21 may include a programmable logic controller (PLC) 21$p$, a hydraulic power unit (HPU) 21$h$, a motor driver 21$m$, a tachometer 21$t$, a load cell 21$d$, and a sensor, such as accelerometer 21$a$.

The foundation 20 may support the pumping unit 1$k$ from the surface 3 and the skid 5 and tower base 19 may rest atop the foundation. The PLC 21$p$ and HPU 21$h$ may be mounted to the skid 5 and/or the tower 15. Lubricant, such as refined and/or synthetic oil 23, may be disposed in the tower base 19 such that the chain 16 is bathed therein as the chain orbits around the chain idler 14 and the drive sprocket 18.

The electric motor 6 may be a one or more, such as three phase, electric motor. The motor driver 21$m$ may be variable speed including a rectifier and an inverter. The motor driver 21$m$ may receive a three phase alternating current (AC) power signal from a three phase power source, such as a generator or transmission lines. The rectifier may convert the three phase AC power signal to a direct current (DC) power signal and the inverter may modulate the DC power signal into a three phase AC power signal at a variable frequency for controlling the rotational speed of the motor 6. The PLC 21$p$ may supply the desired rotational speed of the motor 6 to the motor driver 21$m$ via a data link.

Alternatively, the prime mover may be an internal combustion engine fueled by natural gas available at the well site.

The motor 6 may include a stator disposed in a housing mounted to the skid 5. The rotary linkage 7 may torsionally connect a rotor of the motor 6 to an input shaft of the reducer 8 and may include a sheave connected to the rotor, a sheave connected to the input shaft, and a V-belt connecting the sheaves. The reducer 8 may be a gearbox including the input shaft, an input gear connected to the input shaft, an output gear meshed with the input gear, an output shaft connected to the output gear, and a gear case mounted to the skid 5. The output gear may have an outer diameter substantially greater than an outer diameter of the input gear to achieve reduction of angular speed of the motor 6 and amplification of torque of the motor. The drive sprocket 18 may be torsionally connected to the output shaft of the reducer 8. The tachometer 21$t$ may be mounted on the reducer 8 to monitor an angular speed of the output shaft and may report the angular speed to the PLC 21p via a data link.

The chain 16 may be meshed with the drive sprocket 18 and may extend to the idler 14. The idler 14 may include an idler sprocket 14k meshed with the chain 16 and an adjustable frame 14f mounting the idler sprocket to the tower 15 while allowing for rotation of the idler sprocket relative thereto. The adjustable frame 14f may vary a height of the idler sprocket 14k relative to the drive sprocket 18 for tensioning the chain 16.

The carriage 13 may longitudinally connect the counterweight assembly 12 to the chain 16 while allowing relative transverse movement of the chain relative to the counterweight assembly 12. The carriage 13 may include a block base 13b, one or more (four shown) wheels 13w, a track 13t, and a swivel knuckle 13k. The track 13t may be connected to a bottom of the counterweight assembly 12, such as by fastening. The wheels may be engaged with upper and lower rails of the track 13t, thereby longitudinally connecting the block base 13b to the track 13t while allowing transverse movement therebetween. The swivel knuckle 13k may include a follower portion assembled as part of the chain 16 using fasteners to connect the follower portion to adjacent links of the chain. The swivel knuckle 13k may have a shaft portion extending from the follower portion and received by a socket of the block base 13b and connected thereto by bearings (not shown) such that swivel knuckle 13k may rotate relative to the block base 13b.

The counterweight assembly 12 may be disposed in the tower 15 and longitudinally movable relative thereto. The counterweight assembly 12 may include a box 12b, one or more counterweights 12w disposed in the box, and guide wheels 12g. Orthogonally oriented guide wheels 12g may be connected at each corner of the box 12b for engagement with respective guide rails of the tower 15, thereby transversely connecting the box to the tower. The box 12b may be loaded with counterweights 12w until a total balancing weight corresponding to the weight of the rod string 1r and/or the weight of the column of production fluid, such as equal to the weight of the rod string 1r plus one-half the weight of the fluid column.

FIG. 1D illustrates the accelerometer 21a. The accelerometer 21a may be mounted to a bottom of the counterweight assembly 12 for sensing free fall of the counterweight assembly 12 due to failure of the rod string 1r. For example, the accelerometer 21a may be mounted to the bottom of the carriage track 13t. The accelerometer 21a may include a cap 24c, a body 24b, a fastener 24f, an inertia mass 24m, a sensing element, such as a piezoelectric crystal 24p, a washer 24w, and a circuit 24c. The fastener 24f may be threaded for engaging a threaded socket formed in the body 24b to retain the inertia mass 24m, the piezoelectric crystal 24p, and the washer 24w thereto. The preload on the fastener 24f may also be used to calibrate the piezoelectric crystal 24p. The body 24b may also have a second threaded socket formed therein for receiving a threaded fastener (not shown) to mount the body to the carriage track 13t. The circuit 24c may include a housing connected to the body 24b and an amplifier disposed therein and in electrical communication with the piezoelectric crystal 24p. The amplifier may be in electrical communication with the PLC 21p via a flexible cable. The flexible cable may supply a power signal to the amplifier from the PLC 21p while also providing data communication therebetween and accommodating reciprocation of the counterweight assembly 12 relative to the PLC.

Alternatively, a battery and wireless data link may be mounted to the bottom of the counterweight assembly 12, such as the bottom of the carriage track 13t. The battery may be in electrical communication with the accelerometer 21a and the wireless data link for supplying power thereto. The wireless data link may be in data communication with the accelerometer 21a for transmitting measurements therefrom to a wireless data link of the PLC 21p. Alternatively, the accelerometer 21a may be magnetostrictive, servo-controlled, reverse pendular, or microelectromechanical (MEMS).

The PLC 21p may be programmed to monitor the accelerometer 21a for a threshold measurement indicative of failure of the rod string 1r. The threshold measurement may be substantially greater than routine downward acceleration experienced by the counterweight assembly 12 during normal operation of the pumping unit 1k. The threshold acceleration may be greater than or equal to one-half, two thirds, or three-quarters of the standard acceleration of the Earth's gravity. Should the PLC 21p detect the threshold acceleration measured by the accelerometer 21a, the PLC may operate a manifold of the HPU 21h to supply pressurized brake fluid to the braking system 22, thereby engaging the braking system to halt downward movement of the counterweight assembly 12. Advantageously, using the accelerometer 21a instead of the tachometer 21t to detect failure of the rod string 1r reduces latency in the detection time, which would otherwise allow the counterweight assembly 12 to accrue kinetic energy which would have to be dissipated by the braking system 22.

The PLC 21p may be in data communication with a home office (not shown) via long distance telemetry (not shown). The PLC 21p may report failure of the rod string 1r to the home office and maintain engagement of the braking system 22 until a workover rig (not shown) may be dispatched to the well site to repair the rod string 1r.

FIG. 1C illustrates the braking system 22. The crown 9 may be a frame mounted atop the tower 15. The drum assembly 10 may include a drum 10d, a shaft 10s, one or more (pair shown) ribs 10r connecting the drum to the shaft, one or more (pair shown) pillow blocks 10p mounted to the crown 9, and one or more (pair shown) bearings 10b for supporting the shaft from the pillow blocks while accommodating rotation of the shaft relative to the pillow blocks. The braking system 22 may include one or more (pair shown) disk brakes. Each disk brake may include a disk 22k disposed around and torsionally connected to the shaft 10s, a caliper 22c mounted to the respective pillow block 10p, one or more (pair shown) pistons 22p disposed in a respective chamber formed in the respective caliper, a brake shoe 22s connected to each piston, and a brake pad 22b mounted to each brake shoe. Each piston 22p may be movable relative to the respective caliper 22c between an engaged position (not shown) and a disengaged position (shown). The brake pads 22b may be clear of the respective disks 22k in the disengaged position and pressed against the disks in the engaged position, thereby torsionally connecting the shaft 10s to the pillow blocks 10p. Each piston 22p may be biased toward the disengaged position by a square-cut seal (shown) or a return spring (not shown). Each caliper 22c may have a hydraulic port 22h in fluid communication with the respective piston chambers. A hydraulic flow line may have a lower end connected to the HPU manifold and upper ends connected to the caliper ports 22h. Supply of pressurized brake fluid to the caliper chambers by the HPU 21h may exert fluid force on the pistons 22p, thereby moving the pistons to the engaged position against the bias of the square-cut seals.

Alternatively, drum brakes may be used instead of the disk brakes. Alternatively, the braking system 22 may be pneumatically operated.

Returning to FIGS. 1A and 1B, the load belt 11 may have a first end longitudinally connected to a top of the counterweight box 12b, such as by a hinge, and a second end longitudinally connected to the hanger bar 17, such as by wire rope. The load belt 11 may extend from the counterweight assembly 12 upward to the drum assembly 10, over an outer surface of the drum 10d, and downward to the hanger bar 17. The hanger bar 17 may be connected to the polished rod 4p, such as by a rod clamp, and the load cell 21d may be disposed between the rod clamp and the hanger bar. The load cell 21d may measure tension in the rod string 1r and report the measurement to the PLC 21p via a data link.

In operation, the motor 6 is activated by the PLC 21p to torsionally drive the drive sprocket 18 via the linkage 7 and reducer 8. Rotation of the drive sprocket 18 drives the chain 16 in an orbital loop around the drive sprocket and the idler sprocket 14k. The swivel knuckle 13k follows the chain 16 and resulting movement of the block base 13b along the track 13t translates the orbital motion of the chain into a longitudinal driving force for the counterweight assembly 12, thereby reciprocating the counterweight assembly along the tower 15. Reciprocation of the counterweight assembly 12 counter-reciprocates the rod string 1r via the load belt 11 connection to both members.

Figure 2:
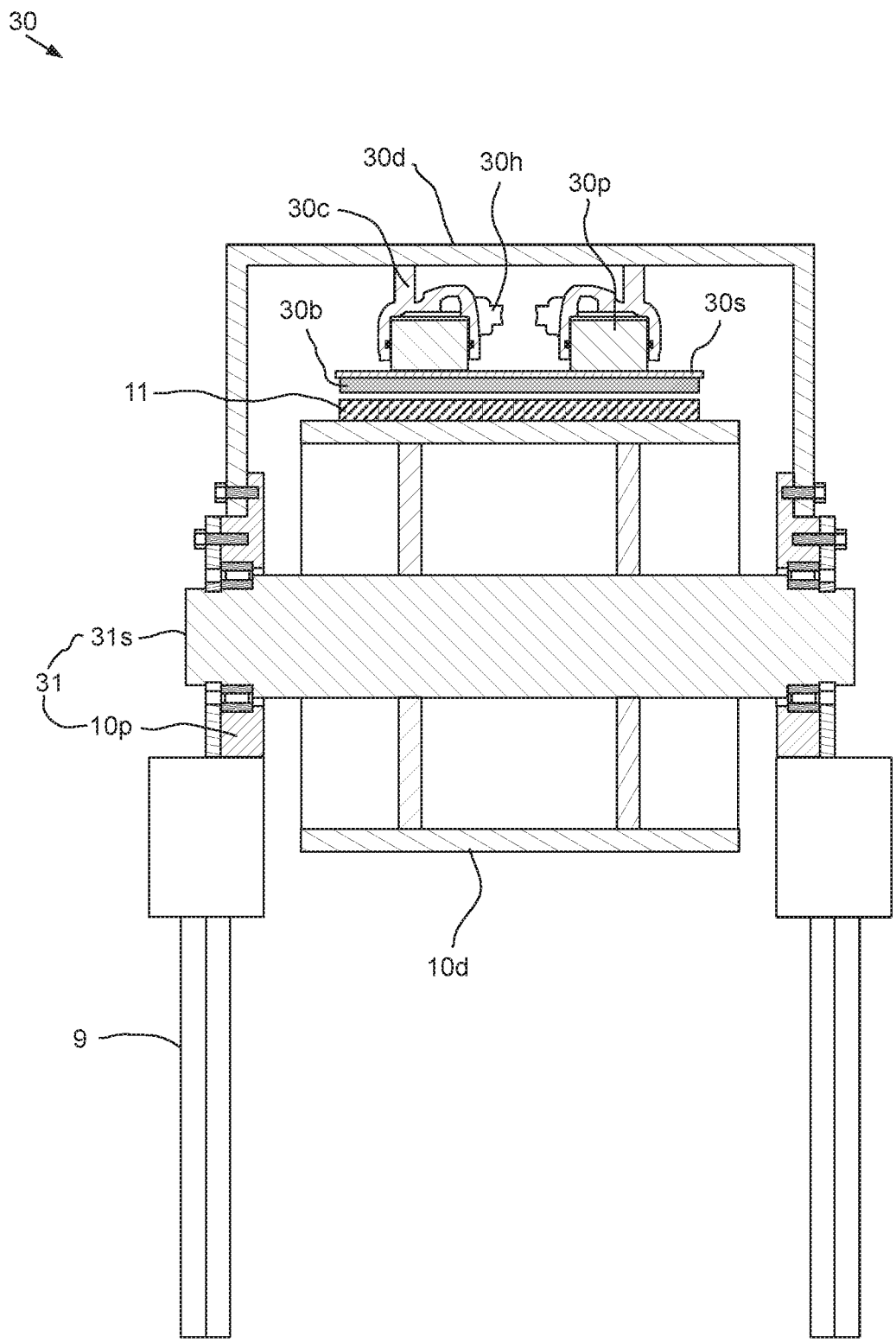
FIG. 2 illustrates a first alternative braking system for use with the long-stroke pumping unit, according to another embodiment of the present disclosure.

FIG. 2 illustrates a first alternative braking system 30 for use with the long-stroke pumping unit 1k, according to another embodiment of the present disclosure. The drum assembly 31 may be slightly modified to accommodate the first alternative braking system 30 by having a modified shaft 31s. The first alternative braking system 30 may include a hood 30d mounted to each pillow block 10p, one or more (pair shown) calipers 30c mounted to the hood, a piston 30p disposed in a chamber formed in each caliper, a brake shoe 30s connected to the pistons 30p, and a brake pad 30b mounted to the brake shoe. Each piston 30p may be movable relative to the respective caliper 30c between an engaged position (not shown) and a disengaged position (shown). The brake pad 30b may be clear of the load belt 11 in the disengaged position and pressed against the load belt in the engaged position, thereby torsionally connecting the load belt to the pillow blocks 10p. Each piston 30p may be biased toward the disengaged position by a square-cut seal (shown) or a return spring (not shown). Each caliper 30c may have a hydraulic port 30h in fluid communication with the respective piston chamber. A hydraulic flow line (not shown) may have a lower end connected to the HPU manifold and upper ends connected to the caliper ports 30h. Supply of pressurized brake fluid to the caliper chambers by the HPU 21h may exert fluid force on the pistons 30p, thereby moving the pistons to the engaged position against the bias of the square-cut seals.

Alternatively, the brake pads 30b may be omitted as a cover layer of the load belt 11 may be made from high friction elastomer or elastomeric copolymer. Alternatively, the first alternative braking system 30 may be pneumatically operated.

Figures 3A, 3B:
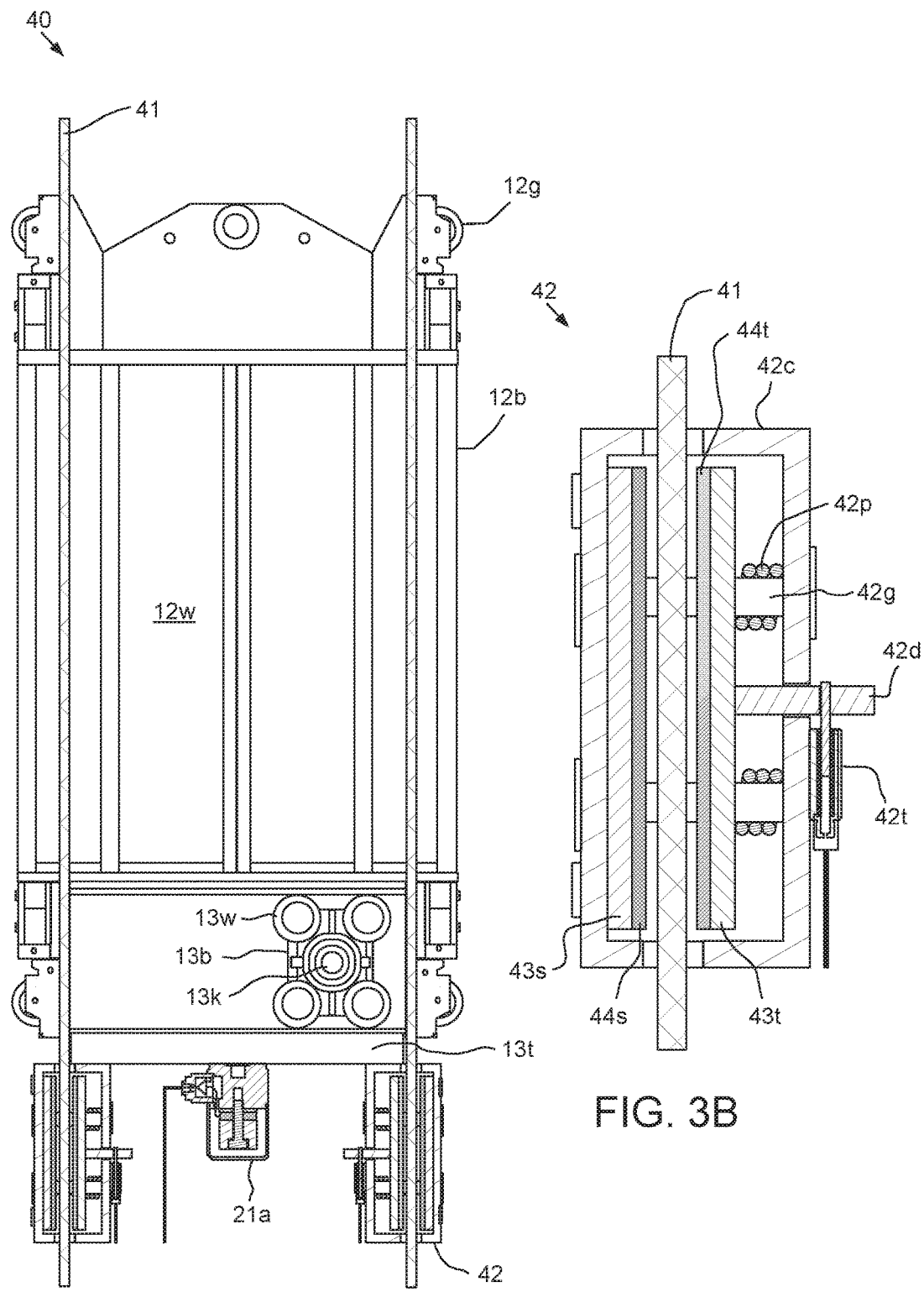
FIG. 3A illustrates a second alternative braking system for use with the long-stroke pumping unit, according to another embodiment of the present disclosure.
FIG. 3B illustrates a brake of the second alternative braking system.

FIG. 3A illustrates a second alternative braking system 40 for use with the long-stroke pumping unit 1k, according to another embodiment of the present disclosure. FIG. 3B illustrates a brake 42 of the second alternative braking system 40. The second alternative braking system 40 may include one or more (pair shown) wire ropes 41 extending along the tower 15 and one or more (pair shown) rope brakes 42 mounted to the bottom of the counterweight assembly 12, such as the bottom of the carriage track 13t. The wire ropes 41 may each be strung between the crown 9 and the tower base 19, have ends connected thereto, and each extend through the respective rope brake 42. Each rope brake 42 may include a caliper 42c mounted to the carriage track 13t, one or more (pair shown) guide rods 42g extending through the respective caliper, a pair of opposing brake shoes 43s,t and pads 44s,t, a trigger rod 42d connected to one of the brake shoes and extending through an opening formed through a wall of the respective caliper, a spring 42p disposed along each guide rod, and a trigger 42t connected to the respective caliper and operable to selectively restrain and release the trigger rod.

One 43s of the brake shoes 43s,t and one 44s of the pads 44s,t of each brake 42 may be connected to the respective caliper 42c. The other one 43t of the brake shoes 43s,t and the other one 44t of the pads 44s,t of each brake 42 may be movable along the respective guide rods 42g relative to the respective caliper 42c between an engaged position (not shown) and a disengaged position (shown). The brake pads 44s,t may be clear of the respective wire ropes 41 in the disengaged position and the movable brake pads 44t may engage, move, and press the respective wire ropes 41 against the respective stationary brake pads 44s in the engaged position, thereby longitudinally connecting the counterweight assembly 12 to the crown 9. The movable pads 44t may be biased toward the engaged position by the respective springs 42p.

Each trigger 42t may be a solenoid movable between a capture position (shown) and a release position (not shown) by energization from the PLC 21p via a respective flexible cable. Each solenoid may have a plunger extending into an opening of the respective trigger rod 42d in the capture position, thereby fastening the trigger rod to the respective caliper 42c against the bias of the respective springs 42p. Should the PLC 21p detect the threshold acceleration measured by the accelerometer 21a, the PLC may energize the solenoids to move the plungers to the release position, thereby engaging the second alternative braking system 40 to halt downward movement of the counterweight assembly 12.

Alternatively, each rope brake 42 may be hydraulically or pneumatically actuated. Alternatively, the second alternative braking system 40 may include a microcontroller and battery mounted to the bottom of the counterweight assembly 12, such as the bottom of the carriage track 13t. In this alternative, the microcontroller may be supplied with power by the battery via lead wires and in electrical communication with the solenoids and accelerometer via lead wires. The microcontroller may then activate the rope brakes 42 autonomously from the PLC 21p and the second alternative braking system 40 may further include a wireless data link. The wireless data link may be in data communication with the microcontroller for reporting activation of the rope brakes 42 to a wireless data link of the PLC 21p.

Figure 4A:
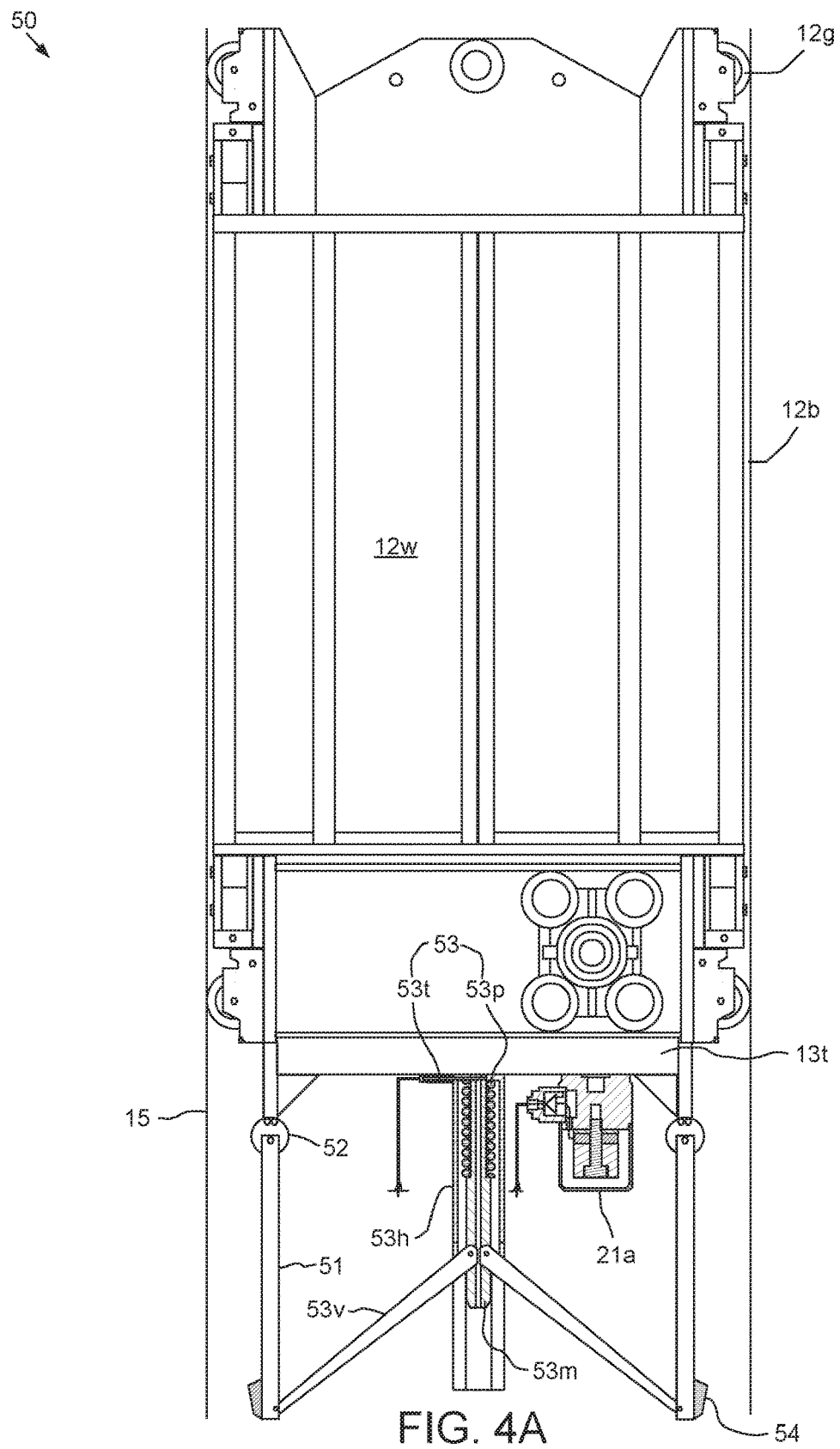
FIG. 4A illustrates a third alternative braking system for use with the long-stroke pumping unit in a disengaged position, according to another embodiment of the present disclosure.
Figure 4B:
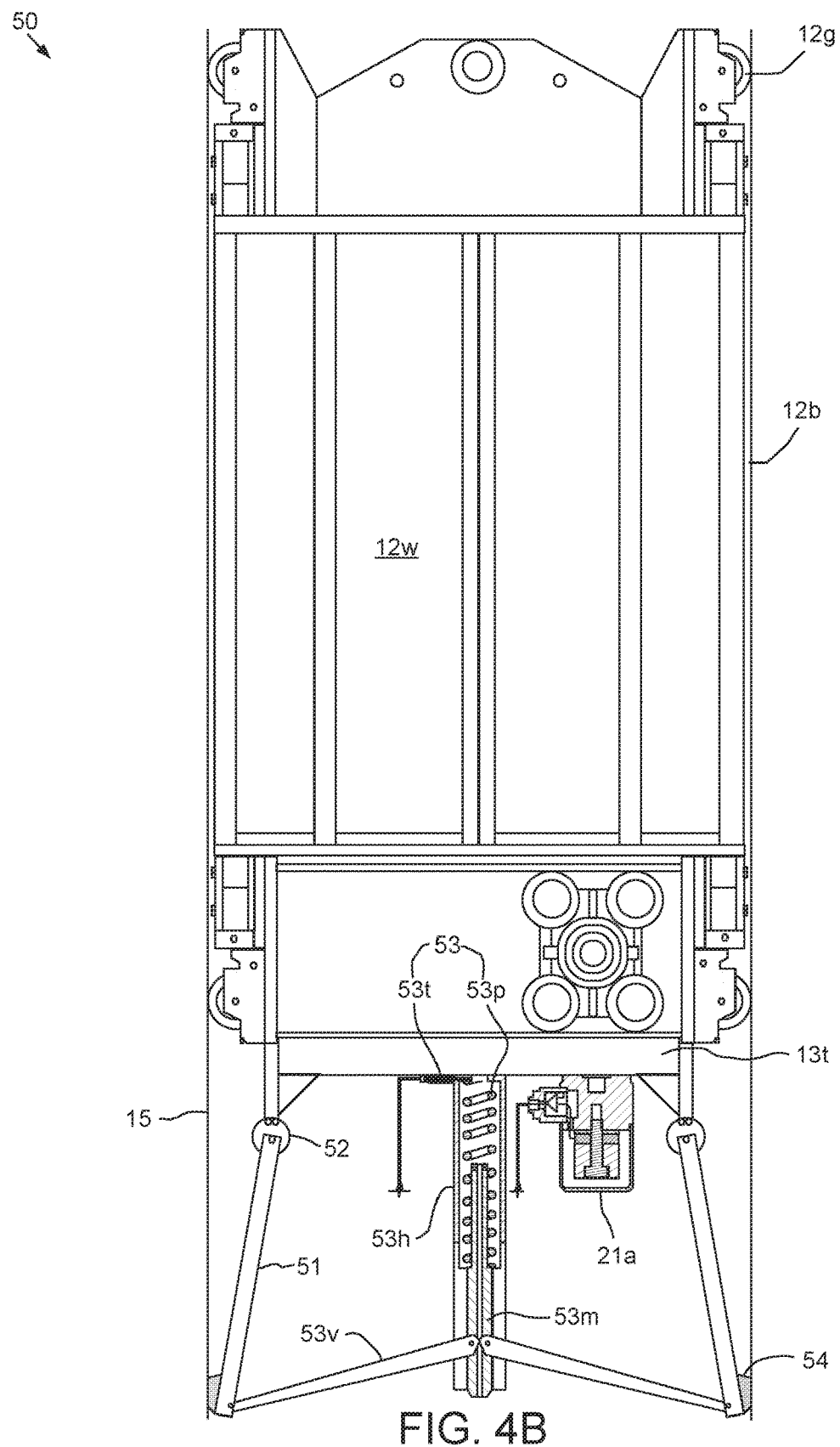
FIG. 4B illustrates the third alternative braking system in an engaged position.

FIG. 4A illustrates a third alternative braking system 50 for use with the long-stroke pumping unit 1k in a disengaged position, according to another embodiment of the present disclosure. FIG. 4B illustrates the third alternative braking system 50 in an engaged position. The third alternative braking system 50 may include one or more (pair shown) brake shoes 51 each longitudinally connected to the counterweight assembly 12, such as by a respective hinge 52 mounted to the bottom of the carriage track 13t, and an actuator 53 mounted to the bottom of the carriage track for swinging the brake shoes between the engaged position and the disengaged position. Each brake shoe 51 may be hinged 52 to the carriage track 13t at an upper end thereof and carry a respective brake pad 54 at a lower end thereof. The brake pads 54 may be clear of the respective guide rails of the tower 15 in the disengaged position and pressed against the respective guide rails in the engaged position, thereby longitudinally connecting the counterweight assembly 12 to the tower.

The actuator 53 may include a tubular housing 53h, a mandrel 53m, a lever 53v for each brake shoe 51, a spring 53p, and a trigger 53t. An upper end of the housing 53h may be mounted to a bottom of the carriage track 13t. The mandrel 53m may be disposed in the housing 53h and an inner end of each lever 53v may be longitudinally connected to a lower portion of the mandrel, such as by a hinge. An outer end of each lever 53v may be longitudinally connected to the lower end of the respective brake shoe, such as by a hinge. Each lever 53v may extend through a respective slot formed in a lower portion of the housing 53h. The spring 53p may be disposed in the housing 53h around the mandrel 53m and have an upper end bearing against an upper end of the housing and a lower end bearing against a shoulder formed in an outer surface of the mandrel. The mandrel 53m may be longitudinally movable relative to the housing 53h between an upper position (FIG. 4A) and a lower position (FIG. 4B) and be biased toward the lower position by the spring 53p.

The trigger 53t may be mounted to the housing 53h. The trigger 53t may be a solenoid movable between a capture position (FIG. 4A) and a release position (FIG. 4B) by energization from the PLC 21p via a respective flexible cable. The solenoid may have a plunger extending through an opening formed in the upper end of the housing 53h and into an opening formed through an upper end of the mandrel 53m in the capture position, thereby fastening the mandrel to the housing against the bias of the spring 53p. Should the PLC 21p detect the threshold acceleration measured by the accelerometer 21a, the PLC may energize the solenoid to move the plunger to the release position, thereby allowing the spring 53p to push the mandrel 53m to the lower position. As the mandrel 53m travels to the lower position, the levers 53v may swing the brake shoes 51 outward until the brake pads 52 engage the respective guide rails of the tower 15.

Alternatively, the mandrel 53m may be a hydraulically or pneumatically actuated piston. Alternatively, the third alternative braking system 50 may include a microcontroller and battery mounted to the bottom of the counterweight assembly 12, such as the bottom of the carriage track 13t. In this alternative, the microcontroller may be supplied with power by the battery via lead wires and in electrical communication with the solenoids and accelerometer via lead wires. The microcontroller may then activate the actuator 53 autonomously from the PLC 21p and the third alternative braking system 50 may further include a wireless data link. The wireless data link may be in data communication with the microcontroller for reporting activation of the actuator 53 to a wireless data link of the PLC 21p.

FIG. 5A illustrates an arrestor system 60 for use with the long-stroke pumping unit in an idle position 1k, according to another embodiment of the present disclosure. FIG. 5B illustrates an arrestor 61 of the arrestor system 60 in the idle position. FIG. 5C illustrates the arrestor 61 in a ready position. The arrestor system may be used with the pumping unit 1k instead of or in addition to any of the braking systems 22, 30, 40, 50, 100, 110. The arrestor system 60 may include one or more (pair shown) arrestors 61. Each arrestor 61 may include a shock absorber 62 disposed in the tower base 19 and a hydraulic circuit 63 in fluid communication with the respective shock absorber.

Each shock absorber 62 may include a bumper 62b, cylinder 62c, a piston 62p, a piston rod 62r, a spring 62g, end caps 62u,w, and damping fluid, such as water, refined oil, and/or synthetic oil 62o. The piston 62p may be disposed in a bore of the cylinder 62c and may divide the bore into a damping chamber and a rebound chamber. The piston rod 62r may be connected to and extend through a bore of the piston 62p. The bumper 62b may be connected to an upper end of the piston rod. Each end cap 62u,w may be connected to the cylinder 62c. The piston rod 62r may also extend through a bore formed through the upper end cap 62u. The piston 62p may carry a sliding seal formed in a respective groove thereof for engagement with a wall of the cylinder 62c to isolate the rebound and damping chambers. The upper end cap 62u may carry a sliding seal formed in a respective groove thereof for engagement with the piston rod 62r to isolate the rebound chamber from an exterior of the shock absorber 62. The cylinder 62c may have a rebound port formed through the wall thereof and exposed to the rebound chamber and a damping port formed through the wall thereof and exposed to the damping chamber.

The spring 62g may be disposed in the damping chamber around the piston rod 62r and may have an upper end bearing against the piston 62p and a lower end bearing against the lower end cap 62w. The piston 62p, piston rod 62r, and bumper 62b may be longitudinally movable relative to the cylinder 62c and end caps 62u,w between the idle position and the ready position and be biased toward the ready position by the spring 62g. Both the damping chamber and the rebound chamber may have the oil or water 62o disposed therein.

Each hydraulic circuit 63 may include a control valve 63c, a damping fluid reservoir 63r, a check valve 63o, a choke 63k, and various flow lines connecting the members. The control valve 63c may be a solenoid actuated shutoff valve connected between the rebound port and the reservoir 63r. The control valve 63c may be movable between an open position (FIG. 5C) and a closed position (FIG. 5B) by energization from the PLC 21p via a respective flexible cable. The check valve 63o and choke 63k may be connected in parallel between the damping port and the reservoir 63r. The check valve 63o may be oriented to allow free flow of the oil or water 62o from the reservoir 63r to the damping chamber to bypass the choke 63k and prevent the flow of oil or water from the damping chamber to the reservoir from bypassing the choke. The choke 63k may be an adjustable choke valve.

Each shock absorber 62 may be restrained in the idle position against the bias of the respective spring 62g by hydraulic lock of the oil or water 62o in the rebound chamber against the closed control valve 63c. Each bumper 62b may be retracted against the respective upper end cap 62u in the idle position and be clear of the path of the counterweight assembly 12 during normal operation of the pumping unit 1k. Should the PLC 21p detect the threshold acceleration measured by the accelerometer 21a, the PLC may energize the solenoid of the control valve 63c to open the valve, thereby allowing the spring 62g to push the piston 62p, piston rod 62r, and bumper 62b to the ready position. As the falling counterweight assembly 12 reaches a lower portion of the tower 15, the carriage track 13t may strike the bumpers 62b, thereby driving the pistons 62p toward the lower end caps 62w. The oil or water 62o expelled from the damping chambers may be forced through the chokes 63k, thereby dissipating the kinetic energy of the falling counterweight assembly 12.

Alternatively, the shock absorbers 62 may share a hydraulic circuit 63 via splitters. Alternatively, the control valves 63c may be moved to replace the check valves 63o, the check valves omitted, and a velocity sensor added to each shock absorber 62. In this alternative, the relocated control valves may be open during normal operation of the pumping unit 1k and the carriage track 13t may engage the bumpers 62b during every stroke. Further, in this alternative, the PLC 21p may monitor the velocity sensor and close the relocated control valves if the velocity exceeds a threshold indicative of a falling counterweight assembly 12, thereby forcing flow of the oil or water 62o fluid through the chokes 63k.

Figures 6A, 6B, 6C:
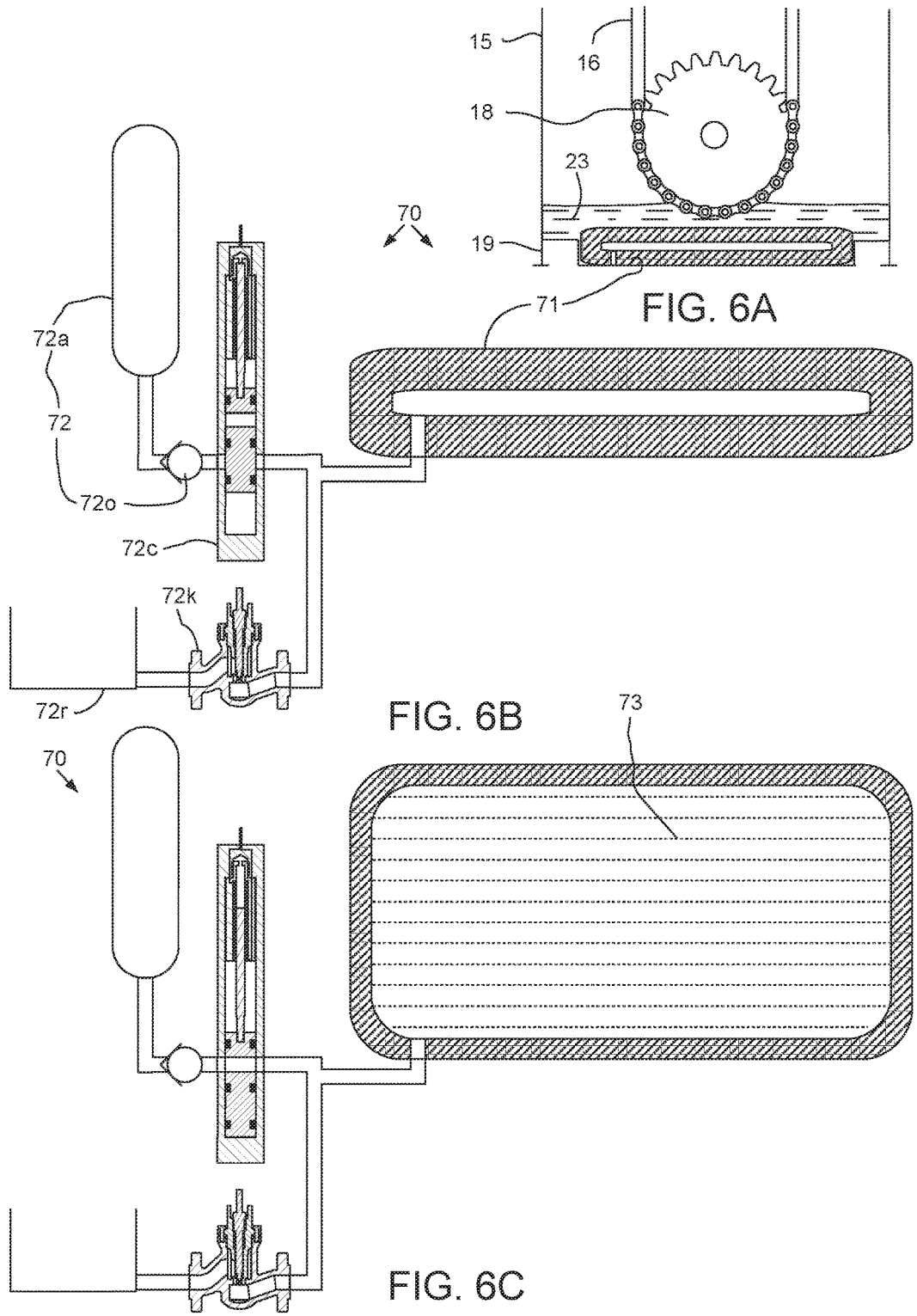
FIGS. 6A and 6B illustrate a first alternative arrestor system for use with the long-stroke pumping unit in an idle position, according to another embodiment of the present disclosure.
FIG. 6C illustrates the arrestor system in a ready position.

FIGS. 6A and 6B illustrate a first alternative arrestor system 70 for use with the long-stroke pumping unit 1k in an idle position, according to another embodiment of the present disclosure. FIG. 6C illustrates the arrestor system 70 in a ready position. The first alternative arrestor system 70 may be used with the pumping unit 1k instead of or in addition to any of the braking systems 22, 30, 40, 50, 100, 110. The first alternative arrestor system 70 may include a bladder 71 disposed in the tower base 19 and a hydraulic circuit 72 in fluid communication with the bladder.

The bladder 71 may be made from an elastomer or elastomeric copolymer for inflation to the ready position and deflation to the idle position using inflation fluid, such as water, refined oil, and/or synthetic oil 73. Additionally, the bladder 71 may be reinforced (not shown) with fiber or cord. The bladder 71 may have a port formed through a wall thereof connected to the hydraulic circuit 72.

The hydraulic circuit 72 may include an accumulator 72a, a control valve 72c, a collection tank 72r, a check valve 72o, a choke 72k, and various flow lines connecting the members. The accumulator 72a may contain a sufficient volume of the oil or water 73 and be charged to a sufficient pressure to inflate the bladder 71 to the ready position. The control valve 72c may be a solenoid actuated shutoff valve connected between the bladder port and the accumulator 72a. The control valve 72a may be movable between an open position (FIG. 6C) and a closed position (FIG. 6B) by energization from the PLC 21p via a respective flexible cable. The check valve 72o may be connected between the control valve 72c and the accumulator 72a. The check valve 72o may be oriented to allow free flow of the oil or water 73 from the accumulator 72a to the bladder 71 and prevent the flow of oil or water from the bladder to the accumulator. The choke 72k may be an adjustable choke valve connected between the bladder port and the collection tank 72r.

The bladder 71 may be naturally biased toward the idle position and isolated from the accumulator 72a by the closed control valve 72c. The bladder 71 in the deflated idle position may be clear of the path of the counterweight assembly 12 during normal operation of the pumping unit 1k. Should the PLC 21p detect the threshold acceleration measured by the accelerometer 21a, the PLC may energize the solenoid of the control valve 72c to open the valve, thereby allowing the accumulator 72a to inflate the bladder 71 to the ready position. As the falling counterweight assembly 12 reaches a lower portion of the tower 15, the carriage track 13t may strike the inflated bladder, thereby expelling the oil or water 73 therefrom. The oil or water 73 expelled from the bladder 71 may be forced through the choke 72k and into the collection tank 72r, thereby dissipating the kinetic energy of the falling counterweight assembly 12.

Alternatively, the inflation fluid may be a gas, such as compressed air or nitrogen and a compressed gas tank may be used for inflation instead of the accumulator 72a. Alternatively, the inflation fluid may be a gas and the bladder 71 may be inflated using a pyrotechnic gas generator instead of the compressed gas tank. Alternatively, the bladder 71 may be perforated instead of the hydraulic (or gas) circuit having the choke 72k.

Figure 7A:
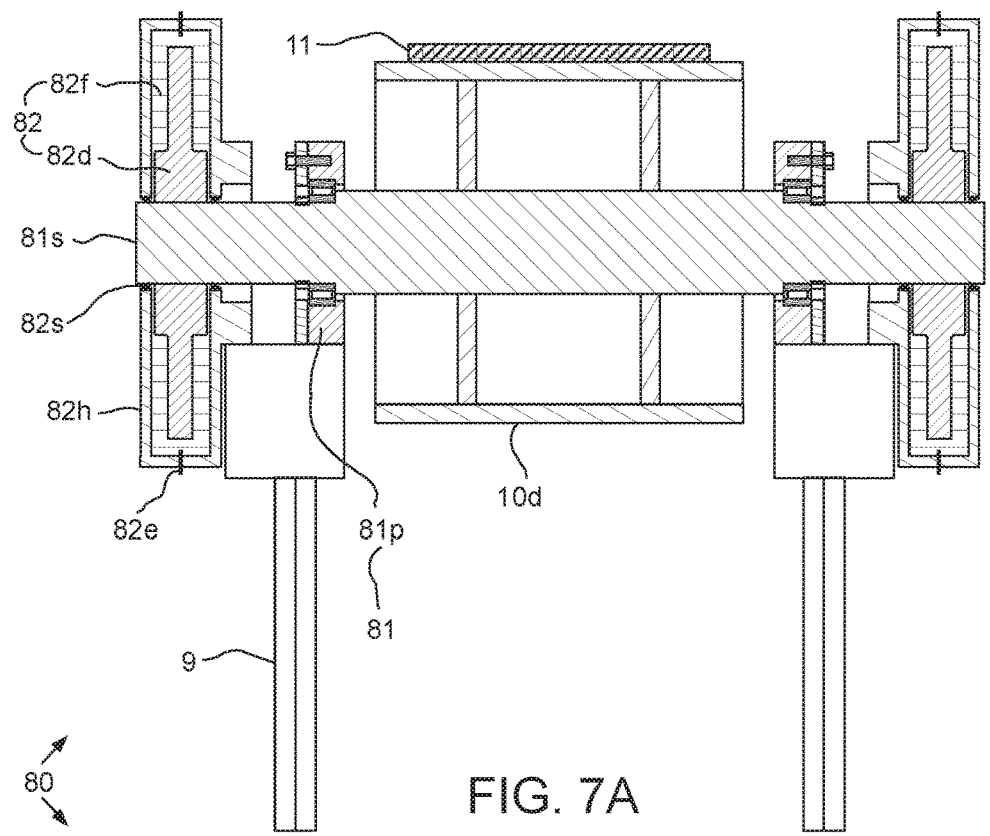
FIG. 7A illustrates a second alternative arrestor system for use with the long-stroke pumping unit in an idle mode, according to another embodiment of the present disclosure.
Figure 7B:
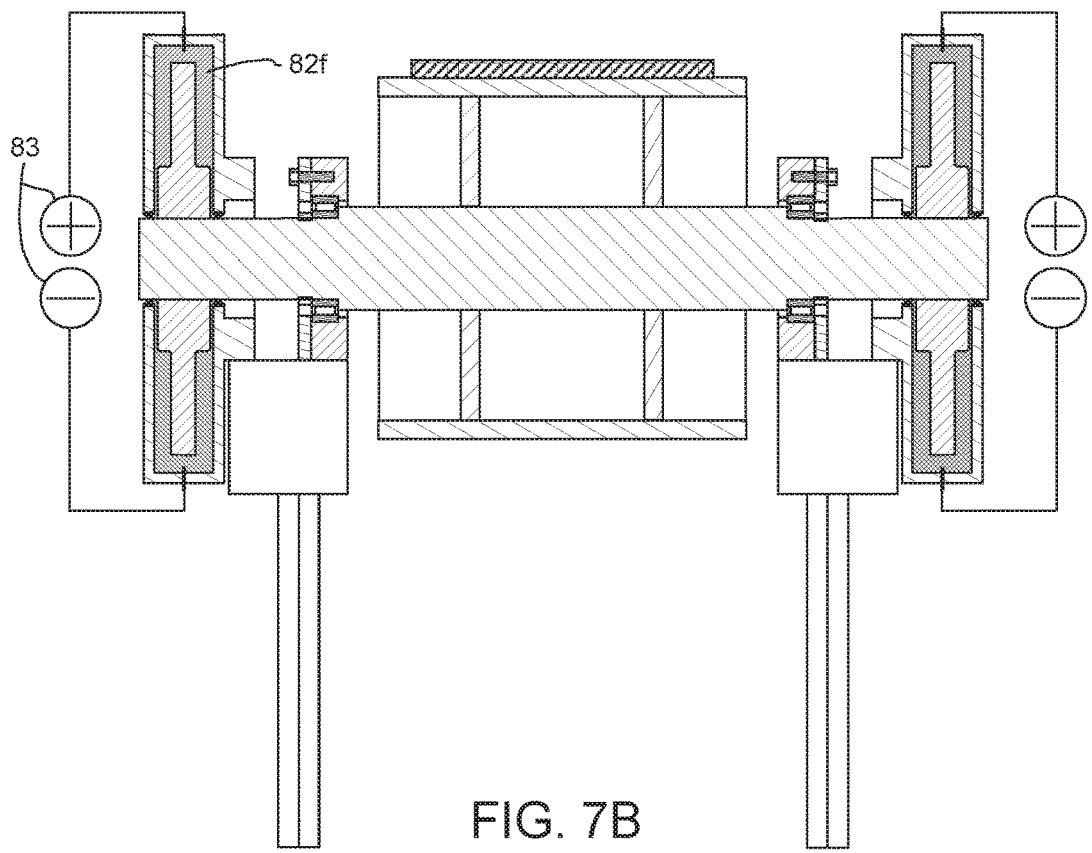
FIG. 7B illustrates the second alternative arrestor system in an active mode.

FIG. 7A illustrates a second alternative arrestor system 80 for use with the long-stroke pumping unit 1k in an idle mode, according to another embodiment of the present disclosure. FIG. 7B illustrates the second alternative arrestor system 80 in an active mode. The second alternative arrestor system 80 may be used with the pumping unit 1k instead of or in addition to any of the braking systems 22, 30, 40, 50, 100, 110. The drum assembly 81 may be slightly modified to accommodate the second alternative arrestor system 80 by having a modified shaft 81s and modified pillow blocks 81p.

The second alternative arrestor system 80 may include one or more (pair shown) arrestors 82. Each arrestor 82 may include a disk 82d torsionally connected to the shaft 81s, a housing 82h mounted to the crown 9, a pair of shaft seals 82s, a pair of electrodes 82e, and electrorheological (ER) fluid 82f disposed in a chamber formed between the housing and the shaft. The housing 82h may be a hollow disk disposed around the shaft 81s and the disk 82d. The shaft seals 82s may be carried by a respective face of the housing 82h adjacent to the shaft 81s and straddling the disk 82d to isolate the chamber from an exterior of the arrestor 82 by sealing the rotating interface between the housing and the shaft. Each electrode 82e may extend through a respective port formed through a wall of the respective housing 82h and into the chamber and the electrodes may be located at opposing locations about the housing to create an electric field in the chamber. Each electrode 82e may be insulated from the housing and an interface between each electrode and the housing may be sealed. An electric cable (not shown) may electrically connect the electrodes to the PLC 21p.

The ER fluid 82f may be lithium polymethacrylate. In the idle mode, the electrodes 82e may be grounded causing the ER fluid 82f to behave as a liquid and letting the disk 82d and shaft 81s freely rotate relative to the housing 82h. Should the PLC 21p detect the threshold acceleration measured by the accelerometer 21a, the PLC may energize 83 the electrodes 82e, thereby creating an electric field across the ER fluid 82f and causing the fluid to behave as a semi-solid. The semi-solid ER fluid 82f may create significant drag force on the disks 82d, thereby controlling descent of the counterweight assembly 12.

Figure 8:
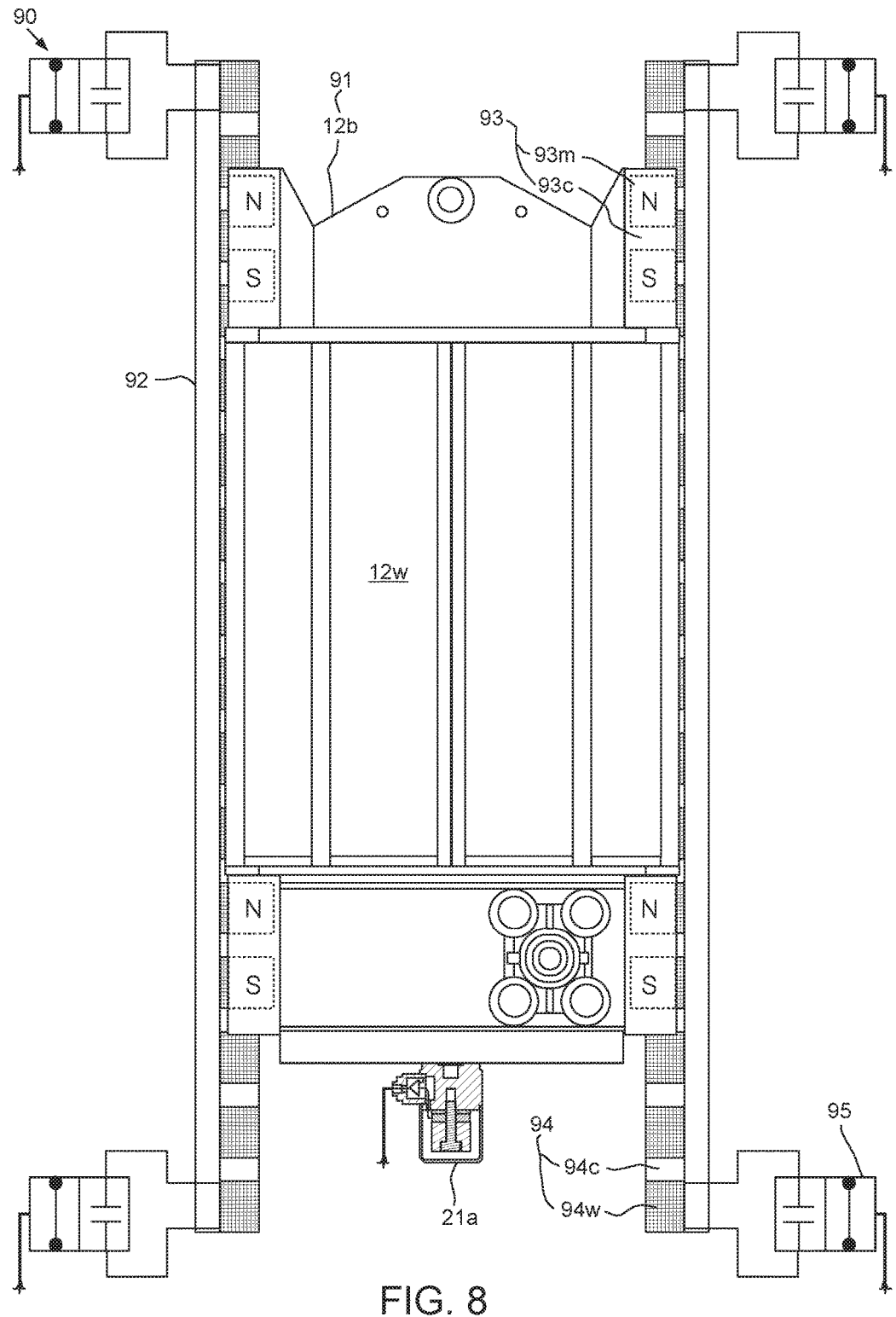
FIG. 8 illustrates a third alternative arrestor system for use with the long-stroke pumping unit in an idle mode, according to another embodiment of the present disclosure.

FIG. 8 illustrates a third alternative arrestor system 90 for use with the long-stroke pumping unit 1k in an idle mode, according to another embodiment of the present disclosure. The third alternative arrestor system 90 may be used with the pumping unit 1k instead of or in addition to any of the braking systems 22, 30, 40, 50, 100, 110. The counterweight assembly 91 may be modified to accommodate the third alternative arrestor system 90 by removing the guide wheels 12g, and the tower 92 may be modified by removing the guide rails thereof. The third alternative arrestor system 90 may include a magnet set 93 for each corner of the counterweight box 12b and a pair of winding sets 94. Each magnet set 93 may include a pair (or more) alternately polarized N,S permanent magnets 93m mounted on a core 93c and the core may be mounted on the counterweight box 12b at the respective corner thereof. Each winding set 94 may include windings 94w spaced along a core 94c, each winding wrapped around the core. Each wound core 94c may be mounted to and extend along a length of the tower 92 at opposite sides thereof. Each winding 94w may be made from an electrically conductive material, such as aluminum, copper, aluminum alloy, or copper alloy and jacketed by a dielectric material. Each winding set 94 may be rectangular and the shape of each magnet set 93 may conform to the winding set, such as being C-shaped, such that the magnet and winding sets serve the function of the guide wheels and guide rails.

Ends of each winding 94w may be connected to a respective switch 95 of a switch bank via lead wires. The PLC 21p may be in communication with an actuator (not shown) of the switch bank. In the idle position, the switches 95 may be in an open position preventing electrical contact between ends of the respective windings 94w and allowing free longitudinal movement of the counterweight assembly 91 relative to the tower 92. Should the PLC 21p detect the threshold acceleration measured by the accelerometer 21a, the PLC may operate the switch bank actuator to close the switches, thereby allowing the magnet sets 93 falling with the counterweight assembly 91 to induce eddy currents in the respective winding sets 94. The eddy currents may create significant drag force on the magnet sets 93, thereby controlling descent of the counterweight assembly 91.

FIG. 9A illustrates a fourth alternative braking system 100 for use with the long-stroke pumping unit 1k in a disengaged position, according to another embodiment of the present disclosure. FIG. 9B illustrates the fourth alternative braking system 100 in an engaged position. The fourth alternative braking system 100 may include the one or more (pair shown) wire ropes 41 extending along the tower 15, one or more (pair shown) cinch brakes 101, each longitudinally connected to the counterweight assembly 12, such as by a respective hinge 102m mounted to the bottom of the carriage track 13t, and the actuator 53 mounted to the bottom of the carriage track for pivoting the cinch brakes between the engaged position and the disengaged position. The wire ropes 41 may each be strung between the crown 9 and the tower base 19, have ends connected thereto, and each extend through the respective cinch brake 101.

Each cinch brake 101 may be hinged 102m to the carriage track 13t at a middle portion thereof and hinged 102b to a respective lever 53v at lower end thereof. Each cinch brake 101 may include a body 103 and a pair of opposed brake pads 104 connected to the respective body. The brake pads 104 may be aligned with and clear of the wire ropes 41 in the disengaged position and may be tilted relative to the wire ropes in the engaged position. The tilt of the brake pads 104 relative to the wire ropes 41 may create pinch points 105 therebetween, thereby longitudinally connecting the counterweight assembly 12 to the tower 15. Should the PLC 21p detect the threshold acceleration measured by the accelerometer 21a, the PLC may energize the solenoid to move the plunger to the release position, thereby allowing the spring 53p to push the mandrel 53m to the lower position. As the mandrel 53m travels to the lower position, the levers 53v may pivot the cinch brakes 101 until the brake pads 104 engage 105 the wire ropes 41.

Alternatively, the cinch brakes 101 may engage the guide rails of the tower 15 and the wire ropes 41 may be omitted. Alternatively, the wire ropes 41 may be replaced by pipes extending along the tower 15 and having ends connected to the tower base 19 and the crown 9. Alternatively, the mandrel 53m may be a hydraulically or pneumatically actuated piston. Alternatively, the fourth alternative braking system 100 may include a microcontroller and battery mounted to the bottom of the counterweight assembly 12, such as the bottom of the carriage track 13t. In this alternative, the microcontroller may be supplied with power by the battery via lead wires and in electrical communication with the solenoids and accelerometer via lead wires. The microcontroller may then activate the actuator 53 autonomously from the PLC 21p and the fourth alternative braking system 100 may further include a wireless data link. The wireless data link may be in data communication with the microcontroller for reporting activation of the actuator 53 to a wireless data link of the PLC 21p.

Figures 10A, 10B:
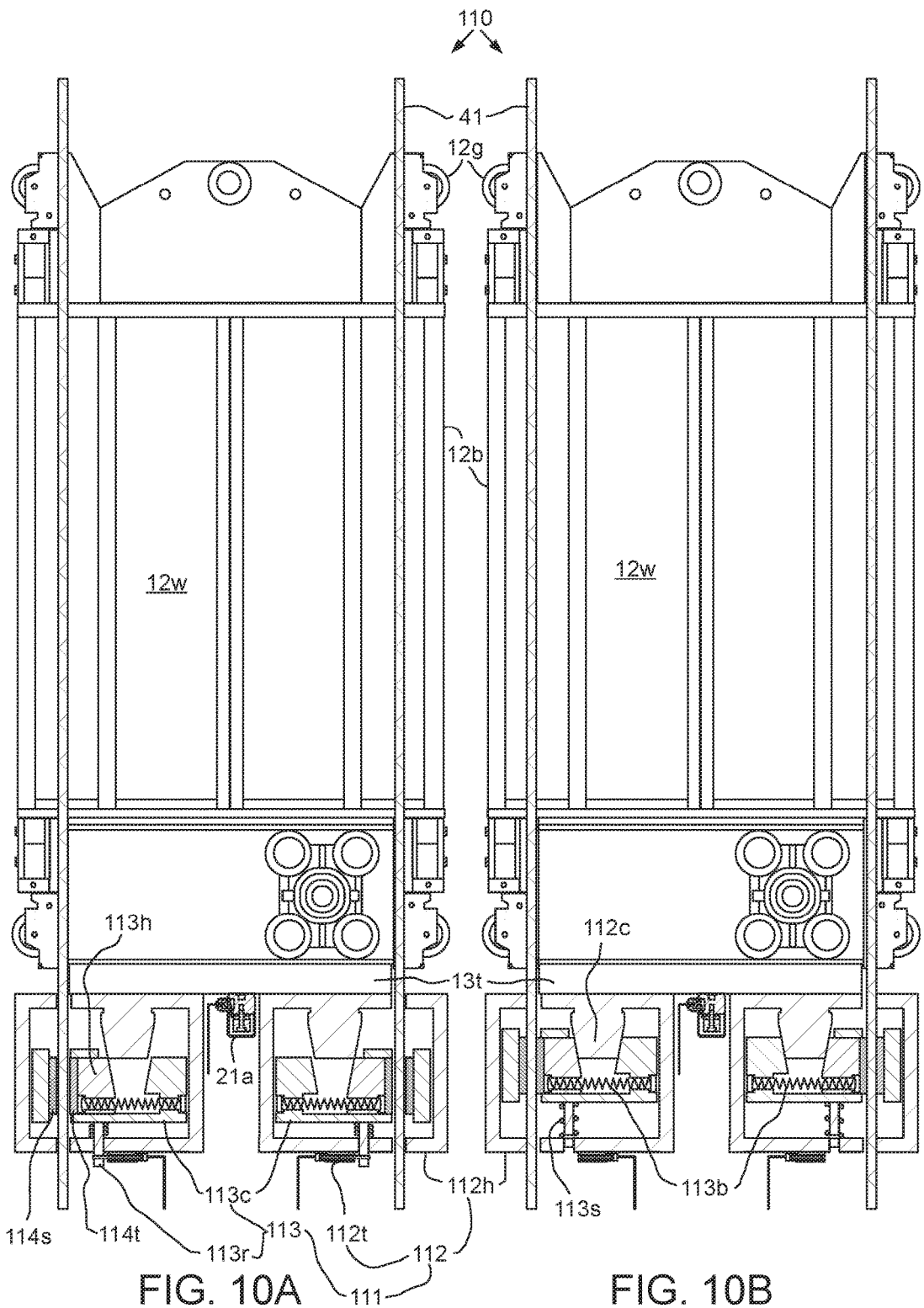
FIG. 10A illustrates a fifth alternative braking system for use with the long-stroke pumping unit in a disengaged position, according to another embodiment of the present disclosure.
FIG. 10B illustrates the fifth alternative braking system in an engaged position.

FIG. 10A illustrates a fifth alternative braking system 110 for use with the long-stroke pumping unit 1k in a disengaged position, according to another embodiment of the present disclosure. FIG. 10B illustrates the fifth alternative braking system 110 in an engaged position. The fifth alternative braking system 110 may include the one or more (pair shown) wire ropes 41 extending along the tower 15 and one or more (pair shown) rope brakes 111 mounted to the bottom of the counterweight assembly 12, such as the bottom of the carriage track 13t. The wire ropes 41 may each be strung between the crown 9 and the tower base 19, have ends connected thereto, and each extend through the respective rope brake 111. Each rope brake 111 may include a stationary unit 112 mounted to the carriage track 13t, and a sliding unit 113 disposed in the respective stationary unit and longitudinally movable relative thereto between the engaged position and the disengaged position.

Each stationary unit 112 may include a housing 112h, a cone 112c extending from an inner surface of the housing, and a trigger 112t mounted on an outer surface of the housing. Each sliding unit 113 may include a caliper 113c, a pair of opposing brake pads 114s,t, a brake shoe 113h, a brake spring 113b, a trigger rod 113r, and a trigger spring 113t. One 114s of the brake pads 114s,t may be connected to the caliper 113c and the other one 114t of the brake pads 114t may be connected to the brake shoe 113h. The caliper 113c may have a passage formed therein and the brake shoe 113h may be disposed in the passage and be transversely movable relative to the caliper. The brake spring 113b may have one end connected to the caliper 113c and the other end connected to the brake shoe 113h and may bias the brake shoe away from the respective wire rope 41. The brake shoe 113h and caliper 113c may each have an inclined surface located adjacent to the cone 112c. The trigger rod 113r may be connected to the caliper 113c and may extend through an opening formed through a wall of the housing 112h. The trigger spring 113t may be disposed along the trigger rod 113r and have ends bearing against the caliper 113c and the housing 112h, thereby biasing the sliding unit 113 toward the engaged position.

Each trigger 112t may be a solenoid movable between a capture position and a release position by energization from the PLC 21p via a respective flexible cable. Each solenoid may have a plunger extending into an opening of the respective trigger rod 113r in the capture position, thereby fastening the trigger rod to the respective housing 112h against the bias of the respective trigger spring 113t. Should the PLC 21p detect the threshold acceleration measured by the accelerometer 21a, the PLC may energize the solenoids to move the plungers to the release position, thereby allowing the trigger springs 113t to push the sliding units 113 toward the cones 112c. Movement of the inclined surfaces of the brake shoes 113h and the calipers 113c along the cones 112c may wedge the brake shoes toward the wire ropes 41, thereby causing the movable brake pads 114t to engage, move, and press the respective wire ropes against the respective stationary brake pads 114s in the engaged position, thereby longitudinally connecting the counterweight assembly 12 to the crown 9. Further, the braking force caused by engagement of the brake pads 114s,t with the wire ropes 41 may tend to push the sliding units 113 along the cones 112c, thereby ensuring that the brake pads remain firmly engaged with the wire ropes.

Alternatively, each rope brake 111 may be hydraulically or pneumatically actuated. Alternatively, the fifth alternative braking system 110 may include a microcontroller and battery mounted to the bottom of the counterweight assembly 12, such as the bottom of the carriage track 13t. In this alternative, the microcontroller may be supplied with power by the battery via lead wires and in electrical communication with the solenoids and accelerometer via lead wires. The microcontroller may then activate the rope brakes 111 autonomously from the PLC 21p and the fifth alternative braking system 110 may further include a wireless data link. The wireless data link may be in data communication with the microcontroller for reporting activation of the rope brakes 42 to a wireless data link of the PLC 21p.

In one embodiment, a long-stroke pumping unit includes: a tower; a counterweight assembly movable along the tower; a drum connected to an upper end of the tower and rotatable relative thereto; a belt having a first end connected to the counterweight assembly, extending over the drum, and having a second end connectable to a rod string; a prime mover for reciprocating the counterweight assembly along the tower; a sensor for detecting sudden acceleration of the counterweight assembly due to failure of the rod string; at least one of: a braking system for halting free-fall of the counterweight assembly; and an arrestor system for absorbing kinetic energy of the falling counterweight assembly; and a controller in communication with the sensor and operable to activate the braking system or the arrestor system in response to detection of the sudden acceleration.

In another embodiment, a long-stroke pumping unit includes a tower; a counterweight assembly movable along the tower; a drum connected to an upper end of the tower and rotatable relative thereto; a belt having a first end connected to the counterweight assembly, extending over the drum, and having a second end connectable to a rod string; a prime mover for reciprocating the counterweight assembly along the tower; and a braking system for halting movement of the counterweight assembly due to failure of the rod string.

In another embodiment, a long-stroke pumping unit includes a tower; a counterweight assembly movable along the tower; a drum connected to an upper end of the tower and rotatable relative thereto; a belt having a first end connected to the counterweight assembly, extending over the drum, and having a second end connectable to a rod string; a prime mover for reciprocating the counterweight assembly along the tower; and an arrestor system for absorbing kinetic energy of the counterweight assembly falling due to failure of the rod string.

In another embodiment, a long-stroke pumping unit includes a tower; a counterweight assembly movable along the tower; a drum connected to an upper end of the tower and rotatable relative thereto; a belt having a first end connected to the counterweight assembly, extending over the drum, and having a second end connectable to a rod string; a prime mover for reciprocating the counterweight assembly along the tower; and a sensor for detecting acceleration of the counterweight assembly due to failure of the rod string. In yet another embodiment, the unit further includes a controller in communication with the sensor and operable to activate a braking system or an arrestor system in response to detection of the acceleration.

In one or more the embodiments described herein, the unit a crown mounted atop the tower.

In one or more the embodiments described herein, the unit includes shaft connected to the drum and rotatable relative to the crown.

In one or more the embodiments described herein, the braking system includes a disk disposed around and torsionally connected to the shaft; a caliper mounted to the crown; a piston disposed in a chamber formed in the caliper and movable relative to the caliper between an engaged position and a disengaged position; a brake shoe connected to the piston; and a brake pad mounted to the brake shoe, and the brake pad is clear of the disk in the disengaged position and pressed against the disk in the engaged position.

In one or more the embodiments described herein, the braking system includes a hood mounted to the crown; a caliper mounted to the hood; a piston disposed in a chamber formed in the caliper and movable relative to the caliper between an engaged position and a disengaged position; and a brake shoe connected to the piston, and the brake shoe is clear of the belt in the disengaged position and pressed against the belt in the engaged position.

In one or more the embodiments described herein, the braking system includes a piston for moving a brake shoe between an engaged position and a disengaged position, wherein the brake shoe is clear of the belt in the disengaged position and pressed against the belt in the engaged position.

In one or more the embodiments described herein, the braking system includes a rope having an end connected to a base of the tower and an end connected to the crown and extending through a rope brake; the rope brake movable between an engaged position and a disengaged position, wherein the brake pads of the rope brake are clear of the rope in the disengaged position and pressed against the rope in the engaged position.

In one or more the embodiments described herein, the braking system includes a brake shoe hinged to the counterweight assembly and carrying a brake pad; an actuator mounted to the counterweight assembly for swinging the brake shoe between an engaged position and a disengaged position, and the brake pad is clear of the tower in the disengaged position and pressed against the tower in the engaged position.

In one or more the embodiments described herein, the arrestor system includes a shock absorber or bladder disposed in a base of the tower.

In one or more the embodiments described herein, the arrestor system includes a dampening fluid selected from the group consisting of water, refined oil, synthetic oil, and combinations thereof.

In one or more the embodiments described herein, the arrestor system includes a disk disposed around and torsionally connected to the shaft; a housing disposed around the disk and the shaft and mounted to the crown; electrorheological (ER) fluid disposed in the housing; a pair of electrodes disposed through the housing and in communication with the ER fluid, and the ER fluid behaves as a liquid when the electrodes are grounded and as a semi-solid when the electrodes are energized.

In one or more the embodiments described herein, the arrestor system includes a magnet set comprising a core mounted to the counterweight assembly and a pair of alternately polarized permanent magnets mounted to the core; a winding set comprising a core mounted to the tower and extending along a length of the tower and windings spaced along the core, each winding wrapped around the core; and one or more switches connected to the windings and operable between an open position preventing electrical contact between ends of the windings and allowing free longitudinal movement of the counterweight assembly relative to the tower, and a closed position allowing the magnet set falling with the counterweight assembly to induce eddy currents in the winding set.

In one or more the embodiments described herein, the braking system includes a cinch brake hinged to the counterweight assembly and carrying opposing brake pads; and an actuator mounted to the counterweight assembly for pivoting the brake cinch brake between an engaged position and a disengaged position, and the cinch brake is aligned with and clear of at least one of: the tower, a wire rope, and a pipe in the disengaged position and pinched against the tower, wire rope, or pipe in the engaged position.

In one or more the embodiments described herein, the braking system includes a rope having an end connected to a base of the tower and an end connected to the crown and extending through a rope brake; the rope brake having a housing mounted to the counterweight assembly; a cone disposed in and connected to the housing; a caliper disposed in and longitudinally movable relative to the housing between an engaged position and a disengaged position; a brake shoe disposed in and transversely movable relative to the caliper; and opposing brake pads, one brake pad connected to the caliper and the other brake pad connected to the brake shoe, each of the brake shoe and the caliper have an inclined surface located adjacent to the cone, and the brake pads are clear of the rope in the disengaged position and pressed against the rope in the engaged position.

In one or more the embodiments described herein, the sensor is an accelerometer mounted to the counterweight assembly.

In one or more the embodiments described herein, the sensor is an accelerometer mounted to the carriage track.

While the foregoing is directed to embodiments of the present disclosure, other and further embodiments of the disclosure may be devised without departing from the basic scope thereof, and the scope of the invention is determined by the claims that follow.

The invention claimed is:

1. A long-stroke pumping unit, comprising:
   a tower;
   a counterweight assembly movable along the tower;
   a drum connected to an upper end of the tower and rotatable relative thereto;
   a belt having a first end connected to the counterweight assembly, extending over the drum, and having a second end connectable to a rod string;
   a prime mover for reciprocating the counterweight assembly along the tower;
   a sensor for detecting acceleration of the counterweight assembly due to failure of the rod string;
   a crown mounted atop the tower;
   a shaft connected to the drum and rotatable relative to the crown;
   a braking system for halting movement of the counterweight assembly; the braking system includes:
      a disk disposed around and torsionally connected to the shaft;
      a caliper mounted to the crown;
      a piston disposed in a chamber formed in the caliper and movable relative to the caliper between an engaged position and a disengaged position;
      a brake shoe connected to the piston; and
      a brake pad mounted to the brake shoe, wherein the brake pad is clear of the disk in the disengaged position and pressed against the disk in the engaged position; and
   a controller in communication with the sensor and operable to activate the braking system in response to detection of the acceleration.

2. The unit of claim 1, wherein the sensor is an accelerometer mounted to the counterweight assembly.

3. A long-stroke pumping unit, comprising:
   a tower;
   a counterweight assembly movable along the tower;
   a drum connected to an upper end of the tower and rotatable relative thereto;
   a belt having a first end connected to the counterweight assembly, extending over the drum, and having a second end connectable to a rod string;
   a prime mover for reciprocating the counterweight assembly along the tower;
   a sensor for detecting acceleration of the counterweight assembly due to failure of the rod string;
   a crown mounted atop the tower;
   a shaft connected to the drum and rotatable relative to the crown;
   a braking system for halting movement of the counterweight assembly, the braking system comprises:
      a hood mounted to the crown;
      a caliper mounted to the hood;
      a piston disposed in a chamber formed in the caliper and movable relative to the caliper between an engaged position and a disengaged position; and
      a brake shoe connected to the piston, and
   the brake shoe is clear of the belt in the disengaged position and pressed against the belt in the engaged position; and
   a controller in communication with the sensor and operable to activate the braking system in response to detection of the acceleration.

4. The unit of claim 3, wherein:
   the braking system further comprises a pad mounted to the brake shoe, and
   the pad is pressed against the belt in the engaged position.

5. The unit of claim 3, wherein the sensor is an accelerometer mounted to the counterweight assembly.

6. A long-stroke pumping unit, comprising:
   a tower;
   a counterweight assembly movable along the tower;
   a drum connected to an upper end of the tower and rotatable relative thereto;
   a belt having a first end connected to the counterweight assembly, extending over the drum, and having a second end connectable to a rod string;
   a prime mover for reciprocating the counterweight assembly along the tower;
   a sensor for detecting acceleration of the counterweight assembly due to failure of the rod string;
   a crown mounted atop the tower;
   a shaft connected to the drum and rotatable relative to the crown;
   a braking system for halting movement of the counterweight assembly, the braking system comprises:
      a rope having an end connected to a base of the tower and an end connected to the crown and extending through a rope brake;
      the rope brake movable between an engaged position and a disengaged position and comprising:

a caliper mounted to the counterweight assembly; and
a pair of opposing brake shoes and pads; and
the brake pads are clear of the rope in the disengaged position and pressed against the rope in the engaged position; and
a controller in communication with the sensor and operable to activate the braking system in response to detection of the acceleration.

7. The unit of claim 6, wherein:
one of the brake shoes and pads is connected to the caliper;
the other one of the brake shoes and pads is movable relative to the caliper; and
the rope brake further comprises:
a spring biasing the other one toward the engaged position; and
a trigger restraining the other one in the disengaged position.

8. The unit of claim 6, wherein the sensor is an accelerometer mounted to the counterweight assembly.

9. A long-stroke pumping unit, comprising:
a tower;
a counterweight assembly movable along the tower;
a drum connected to an upper end of the tower and rotatable relative thereto;
a belt having a first end connected to the counterweight assembly, extending over the drum, and having a second end connectable to a rod string;
a prime mover for reciprocating the counterweight assembly along the tower;
a sensor for detecting acceleration of the counterweight assembly due to failure of the rod string;
a crown mounted atop the tower;
a shaft connected to the drum and rotatable relative to the crown;
a braking system for halting movement of the counterweight assembly, the braking system comprises:
a brake shoe hinged to the counterweight assembly and carrying a brake pad;
an actuator mounted to the counterweight assembly for swinging the brake shoe between an engaged position and a disengaged position; and
the brake pad is clear of the tower in the disengaged position and pressed against the tower in the engaged position; and
a controller in communication with the sensor and operable to activate the braking system in response to detection of the acceleration.

10. The unit of claim 9, wherein the actuator comprises:
a housing mounted to the counterweight assembly;
a mandrel disposed in the housing and longitudinally movable relative thereto; and
a lever having a first end hinged to the brake shoe and a second end hinged to the mandrel.

11. The unit of claim 10, wherein the actuator further comprises:
a spring disposed between the housing and the mandrel and biasing the mandrel toward the engaged position; and
a trigger connected to the housing and restraining the mandrel in the disengaged position.

12. The unit of claim 9, wherein the sensor is an accelerometer mounted to the counterweight assembly.

13. A long-stroke pumping unit, comprising:
a tower;
a counterweight assembly movable along the tower;
a drum connected to an upper end of the tower and rotatable relative thereto;
a belt having a first end connected to the counterweight assembly, extending over the drum, and having a second end connectable to a rod string;
a prime mover for reciprocating the counterweight assembly along the tower;
a sensor for detecting acceleration of the counterweight assembly due to failure of the rod string;
an arrestor system for absorbing kinetic energy of the moving counterweight assembly, the arrestor system comprises a shock absorber or bladder disposed in a base of the tower; and
a controller in communication with the sensor and operable to activate the arrestor system in response to detection of the acceleration.

14. The unit of claim 13, wherein:
the arrestor system comprises the shock absorber and a hydraulic circuit; and
the shock absorber comprises:
a cylinder having a rebound port and a damping port;
a pair of end caps connected to the cylinder;
damping fluid disposed in the cylinder;
a piston disposed in a bore of the cylinder and longitudinally movable relative thereto between a ready position and an idle position;
a piston rod connected to the piston and extending through one of the end caps;
a bumper connected to an end of the piston rod; and
a spring biasing the piston toward the ready position.

15. The unit of claim 14, wherein:
the hydraulic circuit comprises:
a shutoff valve connecting the rebound port to a reservoir; and
a check valve and choke connecting the damping port to the reservoir, closing of the shutoff valve restrains the piston in the idle position;
the bumper is clear of a path of the counterweight assembly in the idle position; and
opening of the shutoff valve allows the spring to move the piston, piston rod, and bumper to the ready position.

16. The unit of claim 13, wherein:
the arrestor system comprises the bladder and an inflation circuit;
the bladder has a port and is naturally biased toward a deflated position;
the inflation circuit comprises a pressurized tank and shutoff valve connecting the bladder port to the pressurized tank;
closing of the shutoff valve maintains the bladder in the deflated position;
the bladder is clear of a path of the counterweight assembly in the deflated position; and
opening of the shutoff valve allows the pressurized tank to inflate the bladder.

17. The unit of claim 16, further comprising a choke connecting the bladder port to a collection tank.

18. The unit of claim 13, wherein the sensor is an accelerometer mounted to the counterweight assembly.

19. A long-stroke pumping unit, comprising:
a tower;
a counterweight assembly movable along the tower;
a drum connected to an upper end of the tower and rotatable relative thereto;
a belt having a first end connected to the counterweight assembly, extending over the drum, and having a second end connectable to a rod string;

a prime mover for reciprocating the counterweight assembly along the tower;
a sensor for detecting acceleration of the counterweight assembly due to failure of the rod string;
a crown mounted atop the tower; and
a shaft connected to the drum and rotatable relative to the crown;
an arrestor system for absorbing kinetic energy of the moving counterweight assembly, the arrestor system comprises:
  a disk disposed around and torsionally connected to the shaft;
  a housing disposed around the disk and the shaft and mounted to the crown;
  electrorheological (ER) fluid disposed in the housing;
  a pair of electrodes disposed through the housing and in communication with the ER fluid; and
the ER fluid behaves as a liquid when the electrodes are grounded and as a semi-solid when the electrodes are energized; and
a controller in communication with the sensor and operable to activate the arrestor system in response to detection of the acceleration.

20. A long-stroke pumping unit, comprising:
a tower;
a counterweight assembly movable along the tower;
a drum connected to an upper end of the tower and rotatable relative thereto;
a belt having a first end connected to the counterweight assembly, extending over the drum, and having a second end connectable to a rod string;
a prime mover for reciprocating the counterweight assembly along the tower;
a sensor for detecting acceleration of the counterweight assembly due to failure of the rod string;
an arrestor system for absorbing kinetic energy of the moving counterweight assembly, the arrestor system comprises:
  a magnet set comprising a core mounted to the counterweight assembly and a pair of alternately polarized permanent magnets mounted to the core;
  a winding set comprising a core mounted to the tower and extending along a length of the tower and windings spaced along the core, each winding wrapped around the core; and
  one or more switches connected to the windings and operable between:
    an open position preventing electrical contact between ends of the windings and allowing free longitudinal movement of the counterweight assembly relative to the tower; and
    a closed position allowing the magnet set falling with the counterweight assembly to induce eddy currents in the winding set; and
a controller in communication with the sensor and operable to activate the arrestor system in response to detection of the acceleration.

21. The unit of claim 20, wherein the winding set has a rectangular shape and the magnet set has a C-shape conforming to the winding set such that the winding set and magnet set serve to guide movement of the counterweight assembly along the tower.

22. A long-stroke pumping unit, comprising:
a tower;
a counterweight assembly movable along the tower;
a drum connected to an upper end of the tower and rotatable relative thereto;
a belt having a first end connected to the counterweight assembly, extending over the drum, and having a second end connectable to a rod string;
a prime mover for reciprocating the counterweight assembly along the tower;
a sensor for detecting acceleration of the counterweight assembly due to failure of the rod string;
a crown mounted atop the tower;
a shaft connected to the drum and rotatable relative to the crown;
a braking system for halting movement of the counterweight assembly, the braking system comprises:
  a cinch brake hinged to the counterweight assembly and carrying opposing brake pads; and
  an actuator mounted to the counterweight assembly for pivoting the brake cinch brake between an engaged position and a disengaged position; and
  the cinch brake is aligned with and clear of at least one of: the tower, a wire rope, and a pipe in the disengaged position and pinched against the tower, wire rope, or pipe in the engaged position; and
a controller in communication with the sensor and operable to activate the braking system in response to detection of the acceleration.

23. A long-stroke pumping unit, comprising:
a tower;
a counterweight assembly movable along the tower;
a drum connected to an upper end of the tower and rotatable relative thereto;
a belt having a first end connected to the counterweight assembly, extending over the drum, and having a second end connectable to a rod string;
a prime mover for reciprocating the counterweight assembly along the tower;
a sensor for detecting acceleration of the counterweight assembly due to failure of the rod string;
a crown mounted atop the tower;
a shaft connected to the drum and rotatable relative to the crown;
a braking system for halting movement of the counterweight assembly, the braking system comprises:
  a rope having an end connected to a base of the tower and an end connected to the crown and extending through a rope brake;
  the rope brake comprising:
    a housing mounted to the counterweight assembly;
    a cone disposed in and connected to the housing;
    a caliper disposed in and longitudinally movable relative to the housing between an engaged position and a disengaged position;
    a brake shoe disposed in and transversely movable relative to the caliper; and
    opposing brake pads, one brake pad connected to the caliper and the other brake pad connected to the brake shoe;
  each of the brake shoe and the caliper have an inclined surface located adjacent to the cone; and
  the brake pads are clear of the rope in the disengaged position and pressed against the rope in the engaged position; and
a controller in communication with the sensor and operable to activate the braking system in response to detection of the acceleration.

24. The unit of claim 23, wherein the rope brake further comprises:
a brake spring biasing the brake shoe away from the wire rope;

a trigger spring biasing the caliper toward the cone; and
a trigger restraining the caliper in the disengaged position.

* * * * *